United States Patent
Venugopal et al.

(10) Patent No.: US 11,681,443 B1
(45) Date of Patent: Jun. 20, 2023

(54) DURABLE DATA STORAGE WITH SNAPSHOT STORAGE SPACE OPTIMIZATION

(71) Applicant: Amazon Technologies, Inc., Seattle, WA (US)

(72) Inventors: Sriram Venugopal, Issaquah, WA (US); Kun Tang, Bellevue, WA (US); Norbert Paul Kusters, Leavenworth, WA (US); Jianhua Fan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 17/006,502

(22) Filed: Aug. 28, 2020

(51) Int. Cl.
  *G06F 3/06* (2006.01)
  *G06F 11/10* (2006.01)

(52) U.S. Cl.
  CPC .......... *G06F 3/0619* (2013.01); *G06F 3/0604* (2013.01); *G06F 3/0641* (2013.01); *G06F 3/0644* (2013.01); *G06F 3/0652* (2013.01); *G06F 3/0683* (2013.01); *G06F 11/10* (2013.01); *G06F 2201/84* (2013.01)

(58) Field of Classification Search
  CPC .... G06F 3/0619; G06F 3/0604; G06F 3/0641; G06F 3/0644; G06F 3/0652; G06F 3/0683; G06F 11/10; G06F 2201/84
  See application file for complete search history.

(56) References Cited

U.S. PATENT DOCUMENTS

| | | | |
|---|---|---|---|
| 6,061,600 A | 5/2000 | Ying | |
| 6,456,599 B1 | 9/2002 | Elliott | |
| 7,254,682 B1 | 8/2007 | Arbon | |
| 7,596,712 B1 | 9/2009 | Gole et al. | |
| 7,702,618 B1 | 4/2010 | Patterson | |
| 7,752,180 B1 | 7/2010 | Fair et al. | |
| 7,941,621 B1 | 5/2011 | Gipp et al. | |
| 8,589,550 B1 | 11/2013 | Faibish et al. | |

(Continued)

FOREIGN PATENT DOCUMENTS

| | | |
|---|---|---|
| WO | 2014039922 | 3/2014 |
| WO | 2016130301 | 8/2016 |

OTHER PUBLICATIONS

U.S. Appl. No. 14/625,535, filed Feb. 18, 2015, Surya Prakash Dhoolam.

(Continued)

*Primary Examiner* — David Yi
*Assistant Examiner* — Alan Otto
(74) *Attorney, Agent, or Firm* — Alexander A. Knapp; Kowert, Hood, Munyon, Rankin & Goetzel, P.C.

(57) ABSTRACT

A data storage system includes a head node and mass storage devices. The head node is configured to store volume data and flush volume data to the mass storage devices. Additionally, the head node is configured to determine a quantity of data partitions and/or parity partitions to store for a chunk of volume data being flushed to the mass storage devices in order to satisfy a durability guarantee. For chunks of data for which complete copies are also stored in an additional data storage system, the head node is configured to reduce the quantity of data partitions and/or parity partitions stored such that required storage space is reduced while still ensuring that the durability guarantee is satisfied.

20 Claims, 16 Drawing Sheets

(56) References Cited

U.S. PATENT DOCUMENTS

| | | |
|---|---|---|
| 8,688,660 B1 | 4/2014 | Sivasubramanian et al. |
| 9,075,773 B1 | 7/2015 | Rakitzis et al. |
| 9,304,867 B2 | 4/2016 | Sivasubramanian et al. |
| 9,342,457 B2 | 5/2016 | Wei et al. |
| 9,563,385 B1 | 2/2017 | Kowalski et al. |
| 9,619,429 B1 | 4/2017 | Wang et al. |
| 9,722,976 B1 | 8/2017 | Li et al. |
| 9,733,862 B1 | 8/2017 | Klemm et al. |
| 9,787,654 B2 | 10/2017 | Vincent et al. |
| 9,985,904 B2 | 5/2018 | Shalev et al. |
| 10,055,352 B2 | 8/2018 | Wei et al. |
| 10,057,187 B1 | 8/2018 | Dhoolam et al. |
| 10,148,570 B2 | 12/2018 | Shalev et al. |
| 10,452,296 B1 | 10/2019 | Greenwood et al. |
| 10,484,015 B2 | 11/2019 | Kusters et al. |
| 10,514,847 B2 | 12/2019 | Kusters et al. |
| 10,521,135 B2 | 12/2019 | Kusters et al. |
| 2001/0044879 A1 | 11/2001 | Moulton et al. |
| 2002/0108017 A1 | 8/2002 | Kenchammana-Hoskote et al. |
| 2003/0110409 A1 | 6/2003 | Gale et al. |
| 2004/0111557 A1 | 6/2004 | Nakatani et al. |
| 2004/0127277 A1 | 7/2004 | Walker et al. |
| 2005/0138461 A1 | 6/2005 | Allen et al. |
| 2005/0198371 A1 | 9/2005 | Smith et al. |
| 2006/0155946 A1 | 7/2006 | Ji |
| 2007/0174660 A1 | 7/2007 | Peddada |
| 2008/0002580 A1 | 1/2008 | Kawada et al. |
| 2008/0205399 A1 | 8/2008 | Delesalle et al. |
| 2009/0217067 A1 | 8/2009 | Radhakrishnan et al. |
| 2010/0074157 A1 | 3/2010 | Doh et al. |
| 2010/0180153 A1 | 7/2010 | Jernigan, IV |
| 2010/0198972 A1 | 8/2010 | Umbehocker |
| 2011/0078108 A1 | 3/2011 | Kumar |
| 2011/0179231 A1 | 7/2011 | Roush |
| 2012/0030426 A1 | 2/2012 | Satran |
| 2013/0282978 A1 | 10/2013 | Kumar et al. |
| 2014/0006543 A1 | 1/2014 | Pitts |
| 2014/0047263 A1 | 2/2014 | Coatney et al. |
| 2014/0092833 A1 | 4/2014 | Vannithamby et al. |
| 2014/0108755 A1 | 4/2014 | Lue et al. |
| 2014/0164694 A1 | 6/2014 | Storer |
| 2014/0201483 A1 | 7/2014 | Min |
| 2014/0304383 A1 | 10/2014 | Guo et al. |
| 2015/0036284 A1 | 2/2015 | Ross et al. |
| 2015/0121028 A1 | 4/2015 | Gupta et al. |
| 2015/0222705 A1 | 8/2015 | Stephens |
| 2015/0261443 A1 | 9/2015 | Wei et al. |
| 2015/0261674 A1 | 9/2015 | Wei et al. |
| 2015/0278243 A1 | 10/2015 | Vincent et al. |
| 2015/0309892 A1 | 10/2015 | Ramasubramaniam et al. |
| 2015/0313028 A1 | 10/2015 | Bell et al. |
| 2015/0324123 A1 | 11/2015 | Storer et al. |
| 2015/0362983 A1 | 12/2015 | Frick |
| 2015/0378762 A1 | 12/2015 | Saladi et al. |
| 2016/0073544 A1 | 3/2016 | Heyd et al. |
| 2016/0085674 A1 | 3/2016 | Stems et al. |
| 2016/0182305 A1 | 6/2016 | Martin et al. |
| 2016/0246677 A1 | 8/2016 | Sangamkar et al. |
| 2016/0246719 A1 | 8/2016 | Teletia et al. |
| 2016/0292025 A1 | 10/2016 | Gupta et al. |
| 2016/0320978 A1 | 11/2016 | Barve et al. |
| 2016/0328168 A1 | 11/2016 | Wei et al. |
| 2016/0342349 A1 | 11/2016 | Borlick et al. |
| 2016/0371145 A1 | 12/2016 | Akutsu et al. |
| 2017/0054626 A1 | 2/2017 | Sivabalan et al. |
| 2017/0063397 A1 | 3/2017 | Richardson et al. |
| 2017/0161162 A1 | 6/2017 | Blea et al. |
| 2017/0177222 A1 | 6/2017 | Singh et al. |
| 2017/0223717 A1 | 8/2017 | Athani |
| 2017/0262191 A1 | 9/2017 | Dewakar et al. |
| 2017/0277590 A1 | 9/2017 | Luse et al. |
| 2017/0364295 A1 | 12/2017 | Sardinha et al. |
| 2017/0371573 A1 | 12/2017 | Kim et al. |
| 2018/0004414 A1 | 1/2018 | Danilov et al. |
| 2018/0011642 A1 | 1/2018 | Koseki et al. |
| 2018/0097657 A1 | 4/2018 | Dao et al. |
| 2018/0150256 A1 | 5/2018 | Kumar et al. |
| 2018/0183868 A1 | 6/2018 | Kusters et al. |
| 2018/0232308 A1* | 8/2018 | Kusters ............... G06F 11/2058 |
| 2020/0083909 A1 | 3/2020 | Kusters et al. |
| 2020/0125271 A1 | 4/2020 | Kusters et al. |

OTHER PUBLICATIONS

U.S. Appl. No. 14/643,479, filed Mar. 10, 2015, Christopher Magee Greenwood.

U.S. Appl. No. 14/642,445, filed Mar. 9, 2015, Marc John Brooker.

U.S. Appl. No. 12/749,449, filed Mar. 29, 2010, Tate Andrew Certain.

Salvador Esparza et al. "Oracle Exalogic Elastic Cloud Machine Owner's Guide" Apr. 30, 2015, pp. 1-302.

U.S. Appl. No. 16/684,992, filed Nov. 15, 2019, Norbert P. Kusters.

U.S. Appl. No. 15/392,835, filed Dec. 28, 2016, Norbert P. Kusters.

U.S. Appl. No. 16/723,391, filed Dec. 20, 2019, Norbert P. Kusters.

U.S. Appl. No. 15/392,878, filed Dec. 28, 2016, Norbert P. Kusters.

U.S. Appl. No. 16/827,565, filed Mar. 23, 2020, Kun Tang.

U.S. Appl. No. 15/433,956, filed Feb. 15, 2017, Norbert Paul Kusters.

U.S. Appl. No. 16/457,095, filed Jun. 28, 2019, Norbert Paul Kusters.

U.S. Appl. No. 16/457,008, filed Jun. 28, 2019, Norbert Paul Kusters.

U.S. Appl. No. 16/832,982, filed Mar. 27, 2020, Kun Tang.

U.S. Appl. No. 16/877,273, filed May 18, 2020, Kun Tang.

U.S. Appl. No. 15/934,608, filed Mar. 23, 2018, Christopher Magee Greenwood,.

* cited by examiner

Maintain metadata for data chunks stored in data storage system, wherein the metadata indicates whether or not a complete copy of the chunk is also stored in an additional data storage system
172

Store a "clean" flag for data chunks added to a volume from a snapshot copy, wherein the "clean" flag indicates that there is a snapshot copy stored for the data chunks in an additional data storage system
174

In response to committing one or more modifying operations in the data storage system that modify data stored in one or more of the chunks marked by the "clean" flag, update the metadata to indicate a "dirty" flag for chunks for which data has been modified
176

In response to an additional snapshot being created and stored in the additional data storage system for the volume, or a portion of the volume, update the metadata for chunks included in the additional snapshot such that the affected chunks are marked with a "clean" flag
178

FIG. 1C

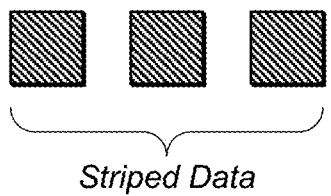
Striped Data
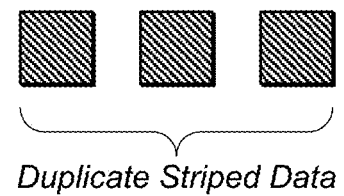
Duplicate Striped Data
FIG. 11E
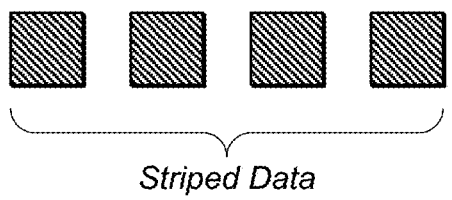
Striped Data
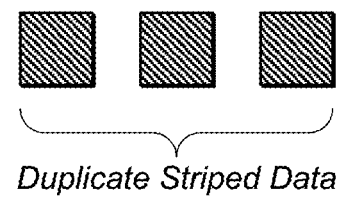
Duplicate Striped Data
FIG. 11F
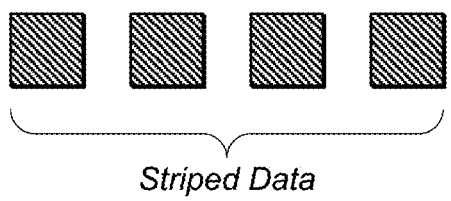
Striped Data
No Parity or Duplicate Data Stored for "Clean" Chunks
FIG. 11G
No Striped Data Stored for "Clean" Chunks
No Parity or Duplicate Data Stored for "Clean" Chunks
FIG. 11H

DURABLE DATA STORAGE WITH SNAPSHOT STORAGE SPACE OPTIMIZATION

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. Availability generally refers to a level of operational performance, such as "uptime," in which a computing system or workload is accessible.

Some virtualized computing environments may store snapshots in an additional storage service, in addition to the block-based storage, such as in a repository storage service. The snapshots may include software stacks or images to be used by virtualized compute servers of a compute service, such as machine images used for booting the compute servers, or point-in-time snapshots used to recover server state as of a desired point in time. Some virtualized computing environments may populate a block-based storage resource attached to a virtualized compute server with a snapshot, wherein the snapshot provides a machine image or stored server state to be used by the attached virtualized compute server.

BRIEF DESCRIPTION OF THE DRAWINGS

FIG. 1C is a flowchart illustrating operations performed by a head node to maintain metadata for chunks of a volume, wherein the metadata is used to determine whether or not a complete copy of the chunks of data are also stored in an additional storage system, according to some embodiments.

FIGS. 11E-11F illustrate example data duplication schemes that may be used by a data storage system to store flushed volume data in data storage sleds of the data storage system, according to some embodiments.

FIG. 11G illustrates an example data storage scheme that may be used by a data storage system to store flushed volume data in data storage sleds of the data storage system, according to some embodiments.

FIG. 11H illustrates an example scheme that may be used by a data storage system to store flushed volume data in data storage sleds of the data storage system, wherein volume data that is durably stored in another data storage system is not stored in the data storage sleds, according to some embodiments.

Figure 1A:
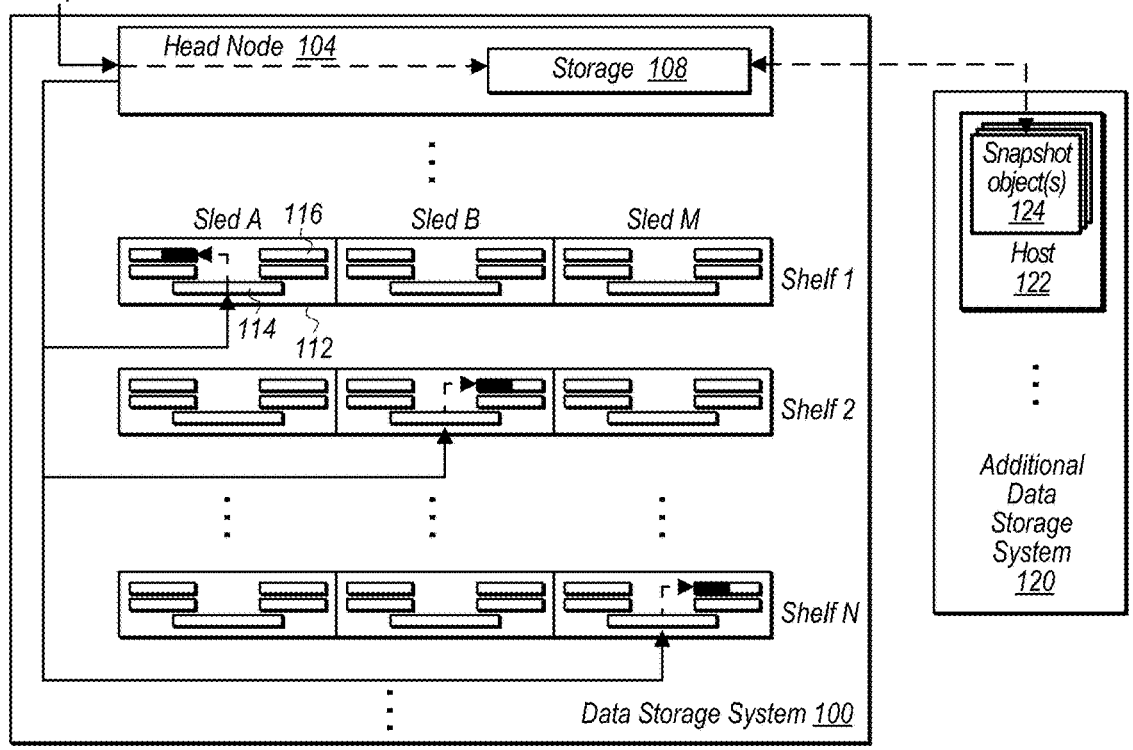
FIG. 1A illustrates a data storage system that includes a head node and a plurality of mass storage devices and also illustrates an additional data storage system that stores snapshot copies of at least some data stored in the head node, wherein the head node is configured to adjust a quantity of partitions of volume data stored to the mass storage devices based on whether or not a complete copy of the volume data is also included in a snapshot stored in the additional data storage system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally described, aspects of the present disclosure relate to providing highly durable storage of volume data in a data storage system, such as a block-based data storage system, while also optimizing storage resources to efficiently provide a guaranteed level of data durability without unnecessarily storing copies of data or parity data in excess of what is required to satisfy the durability guarantee.

Generally described, another aspect of the present disclosure relates to allowing a customer of a data storage service to specify a level of durability to be provided for volume data stored in a data storage system of the data storage service for the customer and also allowing the customer an option to reduce storage resources (and resulting costs) required to meet the customer's specified level of durability by enabling snapshot optimization. For example, in some situations volume data stored in a data storage system for a customer may also be durably stored in a separate data storage system, e.g. such as in a snapshot. Thus, if a component of the data storage system were to fail or otherwise become unavailable, the customer data would not be lost because it is also durably stored in the separate data storage system. Because such volume data is durably stored in at least two separate data storage systems, a durability guarantee can be met for the data while storing fewer copies or fewer parity partitions for the data in the data storage system than would be required to be stored in the data storage system for the data to satisfy the durability guarantee if the data was not also redundantly stored in the separate data storage system. Thus, storage efficiencies can be realized without sacrificing durability by taking into account whether or not a complete redundant copy of a given chunk of data stored in a data storage system is additionally stored in a separate data storage system. For example these efficiencies may be realized when determining a number of data partitions and/or parity partition that are to be stored in the data storage system for a chunk of data, wherein fewer copies or fewer partitions/parity partitions are stored for the chunk of data in the data storage system when it is determined that a complete copy of the chunk of data is also stored in an additional data storage system.

Generally described, another aspect of the present disclosure relates to providing customers of a block-based data storage service (referred to in various implementations as a cloud disks service, a managed disk service, a storage area network service, a persistent disk service, or a block volumes service) with an interface for selecting or specifying durability requirements of volumes stored, or to be stored, in the block-based data storage service on behalf of the customers, including allowing the customer to select whether or not snapshot optimization is to be enabled. For example, some customers may store different types of data or use the storage service for different applications, such that some customers may be more sensitive to data loss than others.

As an example, some customers may be willing to accept lower durability guarantees in exchange for lower costs to store data, while other customers may be willing to accept higher storage costs in exchange for greater data durability guarantees. Thus, instead of a one size-fits-all approach to durability, in some embodiments customers may be provided with an interface to select or specify particular durability requirements desired for a particular volume stored in the block-based storage system on behalf of the customers. Additionally, some customers may be more sensitive to delays in retrieving data than other customers. For example, in some limited situations enablement of snapshot optimization may delay retrieval of customer data. For example, if a storage device failure in the data storage system results in volume data being retrieved from the separate data storage system storing a complete snapshot copy, an amount of time to retrieve the data may be greater than if the volume data were redundantly stored or could be recreated from parity data stored locally in the data storage system. For some customers, cost savings realized by enabling snapshot optimization may be lesser of a concern than a possibility that some data requests may take slightly longer to perform, while other customers may be less sensitive to rare occurrences of delays in data retrieval and may instead prefer to enjoy the costs savings that result from enabling snapshot optimization.

In general, a virtualized block storage volume (referred to in various implementations as a cloud disk, storage disk, cloud volume, disk, block volume, or simple "volume") can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

In order to provide configurable durability for volumes, snapshot optimization, automatic resource allocation adjustments, and/or customer configurable durability for volumes, in some embodiments, a data storage system includes storage servers each having a plurality of head nodes and a plurality of data storage sleds, wherein the head nodes maintain metadata indicating whether or not a complete copy of chunks of data stored in a storage of the head node are also stored in a separate data storage system, such as being stored as a snapshot in a data repository service. Also, the head node may store metadata indicating a volume type, durability guarantee, or other indicator that may be used to determine a number of replicas of the volume data that are to be stored in the head node and which may be used to determine a number of data partitions and/or parity partitions that are to be stored in the mass storage devices of the data storage sleds when the volume data is flushed from the head nodes to the sleds. Additionally, in some embodiments, the metadata may indicate different requirements for flushing chunks of data that are considered "clean" that differ from requirements for flushing chunks that are considered "dirty." As used herein a "clean" chunk of data refers to a chunk of data for which a complete copy is additionally stored in a separate data storage system. For example, volume data created from a snapshot may initially be considered "clean." However, if a modifying operation is committed in the data storage system such that a chunk of data created from the snapshot copy is modified and thus different from the snapshot copy, the chunk of data may be considered "dirty." Additionally, chunks of data for which a snapshot does not exist or is not up-to-date may be considered "dirty" chunks. When snapshot optimization is enabled "clean" and "dirty" chunks may be treated differently during a flush operation.

For example, a lower durability requirement may be applied to "clean" chunks which may take the form of fewer data partitions or parity partitions being stored in the mass storage devices of the data storage system than are stored for chunks considered to be "dirty". As an example, in some embodiments, four data partitions and two parity partitions may be stored for chunks considered to be "dirty" (e.g. chunks for which a complete copy is not also stored in a separate data storage system). However, for chunks considered to be "clean" the flushing operation may cause the data of the chunk to be stored as four data partitions on the mass storage devices of the data storage system without creating or storing any parity partitions for the chunk considered to be "clean." Also, in some embodiments, parity partitions may be stored for both "clean" and "dirty" chunks. However, a different erasure encoding procedure may be applied for "clean" chunks that results in fewer parity partitions being stored for "clean" chunks than are stored for "dirty" chunks.

Also in some embodiments, data duplication may be used in addition to, or as an alternative to, erasure encoding in order to meet durability guarantees. In some embodiments, different numbers of duplicate stripes or other duplicate copies of volume data being flushed to mass storage devices of a data storage system may be generated based on whether or not the chunk being flushed is a "clean" chunk or a "dirty" chunk. For example, in some embodiments, redundant copies of "dirty" chunks may be stored but only single copies of "clean" chunks may be stored. In other embodiments, other duplication schemes may be used, such as storing multiple redundant copies for "dirty" chunks and storing fewer redundant copies for "clean" chunks.

In some embodiments, a particular head node of a plurality of head nodes of a data storage system may be designated as a primary head node for a volume partition and one or more other head nodes of the data storage system may be designated as one or more secondary (or reserve) head nodes for the volume partition. The primary head node may store volume data for the volume partition, such as volume data recreated from a snapshot and/or write data included with write requests directed to the volume partition and may cause the volume data, such as the volume data recreated from the snapshot and/or the write data, to be stored to one or more replicas stored by the one or more secondary head nodes. Additionally, the head node designated as the primary head node may cause accumulated volume data stored by the head node to be flushed to the data storage sleds in response to one or more flush triggers being met. The flushed volume data may be partitioned and/or erasure encoded and stored across a plurality of different mass storage devices in a plurality of different data storage sleds of the data storage system. A number of data partitions and parity partitions to be stored for the volume data on the mass storage devices as part of performing the flush operation may be determined based on: a durability guarantee for the volume, whether or not snapshot optimization is enabled for the volume; and whether or not respective ones of the chunks of data being flushed have complete copies stored in an additional data storage system (e.g. whether or not the chunks are "clean" chunks or "dirty" chunks).

In some embodiments, data may be initially stored in a storage of a head node and replicated to a storage of one, two, or more other head nodes, and may be asynchronously copied to multiple mass storage devices in different data storage sleds that form a RAID array (random array of independent disks) to store the data. In some embodiments, recently stored data or frequently accessed data may remain in a head node storage to allow for low latency access to the data. The data may then be copied to mass storage devices in data storage sleds of a data storage unit of the data storage system after a certain amount of time has elapsed since the data was last accessed or stored. Relocating the data to the mass storage devices may maintain or increase a durability of the data as compared to the data being stored in a storage of a primary head node and being replicated to a storage of one, two, or more secondary/reserve head nodes. In some embodiments, other criteria may be used to determine when data stored in a storage of a head node is to be moved to mass storage devices of data storage sleds of a data storage unit. For example, data may be collected in a log of a head node and upon an amount of data being stored in the log exceeding a threshold amount, the data may be relocated to mass storage devices of data storage sleds of a data storage unit of the data storage system.

In some embodiments, a data storage unit of a data storage system may include multiple head nodes, multiple data storage sleds, and at least two networking devices. The data storage unit may further include connectors for coupling the data storage unit with at least two separate power sources. The data storage unit may also include at least two power distribution systems within the data storage unit to provide redundant power to the head nodes, the data storage sleds, and the networking devices of the data storage unit. Furthermore, the at least two networking devices of the data storage unit may implement at least two redundant networks within the data storage unit that enable communications between the head nodes of the data storage unit and the data storage sleds of the data storage unit. Furthermore, the at least two networking devices of the data storage unit may implement at least two redundant networks within the data storage unit that enable communications between the head nodes of the data storage unit and external clients of the data storage unit. In some embodiments, a data storage unit that includes redundant networks and redundant power may provide high reliability and data durability for data storage and access while storing data locally within devices mounted within a single rack.

In some embodiments, a data storage unit of a data storage system may include multiple head nodes that are assigned network addresses that are routable from devices external to the data storage unit. Thus, external clients may communicate directly with head nodes of a data storage unit without the communications being routed through a control plane of the data storage system that is external to the data storage unit, such as a zonal control plane. Also, a data storage system that includes multiple data storage units may implement a zonal control plane that assigns volumes or volume partitions to particular ones of the data storage units of the data storage system. Also, a zonal control plane may coordinate operations between data storage units, such as rebalancing loads by moving volumes between data storage units. However, a data storage unit may also implement a local control plane configured to perform fail over operations for head nodes and mass storage devices of data storage sleds of the data storage unit. Because head nodes of a data storage unit may communicate directly with client devices and because a local control plane may manage fail over operations within a data storage unit, the data storage unit may operate autonomously without relying on a zonal control plane once a volume has been created on the data storage unit.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, in order to prevent corruption of data stored in mass storage devices of a data storage system, a control plane may interface with a sled controller of a data storage sled of the data storage system. The data storage sled may include multiple mass storage devices serviced by the sled controller. Also, portions of respective mass storage devices of a particular data storage sled may be reserved for a particular volume serviced by a particular head node functioning as a primary head node for the particular volume. In order to reserve the portions for the particular volume or a volume partition of the particular volume, a sled controller of a data storage sled may provide a token to a head node requesting to reserve the portions. Once the portions are reserved for the particular volume or volume partition by the head node acting as the primary head node, the head node while acting as a primary head node for the particular volume or volume partition, may provide the token to the sled controller along with a write request when writing new data to the portions. The sled controller may verify the token and determine the head node is authorized to write to the portions. Also, the sled controller may be configured to prevent writes from head nodes that are not authorized to write to the particular portions of the mass storage devices of the data storage sled that includes the sled controller. The sled controller may refuse to perform a write request based on being presented an invalid token or based on a token not being included with a write request.

In some embodiments, a control plane such as a local control plane or a zonal control plane of a data storage system may issue unique sequence numbers to head nodes of the data storage system to indicate which head node is a primary head node for a particular volume or volume partition. A primary head node may present a sequence number issued from a control plane to respective ones of the sled controllers of respective ones of the data storage sleds to reserve, for a particular volume or volume partition, respective portions of mass storage devices serviced by the respective ones of the respective sled controllers. In response, the sled controllers may issue a token to the primary head node to be included with future write requests directed to the respective portions.

In order to facilitate a failover operation between a primary head node and a reserve head node of a set of reserve head nodes, a control plane may issue new credentials, e.g. a new sequence number, to a set of head nodes that includes a reserve head node assuming a role of primary head node for a volume or volume partition. Additionally, once a replacement reserve head node has been designated for the volume partition, the control plane may issue another new credential, e.g. a new sequence number. In some embodiments, each time a membership change occurs for a set of head nodes that implement a primary head node and a set of two or more reserve head nodes for a volume partition, a control plane may issue a new sequence number to the head nodes included in the set with the changed membership. In some embodiments, the newly issued sequence number may be used to perform a failover and to ensure writes replicated between the head nodes and written to the data storage sleds are the most current writes for the volume partition. For example, a newly assigned primary head node may present the credentials, e.g. new sequence number, to respective sled controllers to receive respective tokens that supersede tokens previously issued to a previous head node acting as a primary head node for a particular volume or volume partition that had data stored in portions of mass storage devices service by the sled controller. Thus, during a fail over event, a previous primary head node may be fenced off from portions of mass storage devices to prevent corruption of data stored on the mass storage devices during the failover event.

In some embodiments, a data storage system may utilize the issuance of new credentials as part of a failover as a method of tracking failure statistics for system components of the data storage system.

In at least some provider networks, a network-accessible virtual compute service may be established, enabling clients to utilize virtualized compute servers (which may also be referred to as "compute instances" herein) set up on their behalf at resource hosts managed by the provider network operator. A given resource host may implement, at a given point in time, one or more compute instances, as well as a virtualization management software stack (e.g., a hypervisor and/or one or more administrative operating system instances). Snapshots may be used in various embodiments to transfer data from one or more data repositories to target volumes (e.g., boot volumes, or other block-level storage volumes) accessible from the compute instances, thus enabling various phases of operating system execution (such as boot sequences) and/or application execution (e.g., database initialization), etc.

According to some embodiments, a block-based storage service of the provider network may enable clients to create or instantiate virtual block storage devices, such as mountable block-level storage volumes. The virtual block storage devices may implement block device programmatic interfaces for I/O, and may enable one or more storage volumes to be programmatically attached to a compute instance to support networked block-level I/O operations (as opposed to, for example, file-level I/O operations) from the compute instance. In some embodiments, for example, a block-based storage service may expose a "CreateVolume" application programmatic interface (API), enabling clients to specify a volume size, as well as various other parameters such as a provisioned performance level to be supported by the block-based storage service (expressed in units such as block I/O operations per second) for a requested volume. Also, as discussed herein a customer or client may be enabled to specify a durability for the volume and/or whether snapshot optimization is to be enabled for the volume. An "AttachVolume" API may be supported in such an embodiment to programmatically attach a specified volume to a specified compute instance. After a given volume implemented by the block-based storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances.

In at least some embodiments, clients of a block-based storage service may be able to generate point-in-time snapshots of their volumes programmatically, e.g., using a "CreateSnapshot" API. The point-in-time snapshot may be stored within a different storage service of the provider network in at least some embodiments, such as a storage repository service that exposes a web-services interface rather than a block device interface. In some embodiments, the storage repository service may be an object-based storage service as opposed to a block-based storage service.

For example, in at least some embodiments, the repository storage service may be configured to store key-value objects, e.g. the repository storage service may be an object-based storage service where each object is simply considered as an unstructured collection of bits identified by a key. As opposed to the block device interfaces implemented by the block-based storage service, in at least some embodiments the repository service may implement a web services API, so that, for example, clients of the repository service may store data directly to, and access data directly from, the repository service without being required to attach or mount any devices, and without necessarily using compute instances of the provider network. In various embodiments, the provider network may support high data durability levels, for either the block-based storage service, the storage repository, or both. Various types of data replication techniques, such as full replication or erasure coding algorithms, may be used to ensure the desired data durability in different embodiments. In some embodiments, the storage repository service may provide an equal or greater durability guarantee than is provided by the block-based storage service.

In some embodiments, a new volume may be created using an existing snapshot as a data source for the volume. For example, a "CreateVolume" call may specify a source snapshot. In some embodiments, a volume populated with data from an existing snapshot may be attached to a desired compute instance, thus setting the state of the compute instance attached to the volume to a point in time at which the snapshot was generated. In some embodiments, a same snapshot may be used to create volumes for a plurality of compute instances. A number of other APIs to manage volumes and snapshots may be supported by a block-based storage service in various embodiments, such as DetachVolume, DeleteVolume, DescribeVolumes (to obtain configuration information regarding a specified set of volumes), DeleteSnapshot, CopySnapshot, UpdateSnaphsot, and so on. It is noted that in at least in some embodiments, a given snapshot used as a source for a volume may not necessarily represent a single point in time (i.e., not all snapshots need be point-in-time snapshots).

In some embodiments, snapshot objects or other types of objects stored at a storage repository service may be used for boot volumes for compute instances, e.g., to boot up compute instances. Thus, in such embodiments, the software and configuration metadata needed to launch or start up a given compute instance (e.g., an instance that is to run a specified webserver W1 on an operating system O1) may be bundled into a snapshot stored at the repository storage service. Such a snapshot may be used to populate (e.g. instantiate the contents of various blocks of) a bootable volume implemented by a block-based storage service. For example, snapshot data used to populate a volume of a block-based storage service may be used to boot up a compute instance with a desired configuration.

When a compute instance is launched or started for the first time, contents of its boot volume may be obtained from a repository storage service in at least some embodiments.

FIG. 1A illustrates a data storage system that includes a head node and a plurality of mass storage devices and also illustrates an additional data storage system that stores snapshot copies of at least some data stored in the head node, wherein the head node is configured to adjust a quantity of partitions of volume data stored to the mass storage devices based on whether or not a complete copy of the volume data is also included in a snapshot stored in the additional data storage system, according to some embodiments.

In some embodiments, a data storage system includes a head node and a plurality of mass storage devices. The mass storage devices may be mounted in sleds that are arranged on shelves of a cabinet or rack of the data storage system. In some embodiments, a data storage system may include multiple head nodes and multiple data storage sleds. For example, data storage system 100 includes head node 104 and shelves 1-N comprising sleds A-M, wherein each sled 112 includes a sled controller 114 and mass storage devices 116. In some embodiments, data storage system 100 may implement at least part of a block-based data storage, such as block-based storage service 620 described in regard to FIG. 6. In some embodiments, data storage system 100 may be part of a provider network, such as provider network 600 described in regard to FIG. 6.

In some embodiments, an additional data storage system, such as additional data storage system 120, may include resource hosts 122 that store snapshot objects 124. The snapshot objects may include snapshots provided to head node 104 to be stored in storage 108 of head node 104. Also, the snapshots may include point-in-time snapshots indicating a current state of data stored in data storage system 100. In some embodiments, an additional data storage system 120 may be part of an additional storage service offered by a provider network. For example, in some embodiments, data storage system 100 may be part of a block-based storage service offered by a provider network and additional data storage system 120 may be part of an object-based storage service offered by the same provider network. For example, in some embodiments, data storage system 100 may be part of a block-based storage service 620, additional data storage service 120 may be part of an object-based storage service 670 (as also described in regard to FIG. 6) and both services may be included in a same provider network 600.

Figure 6:
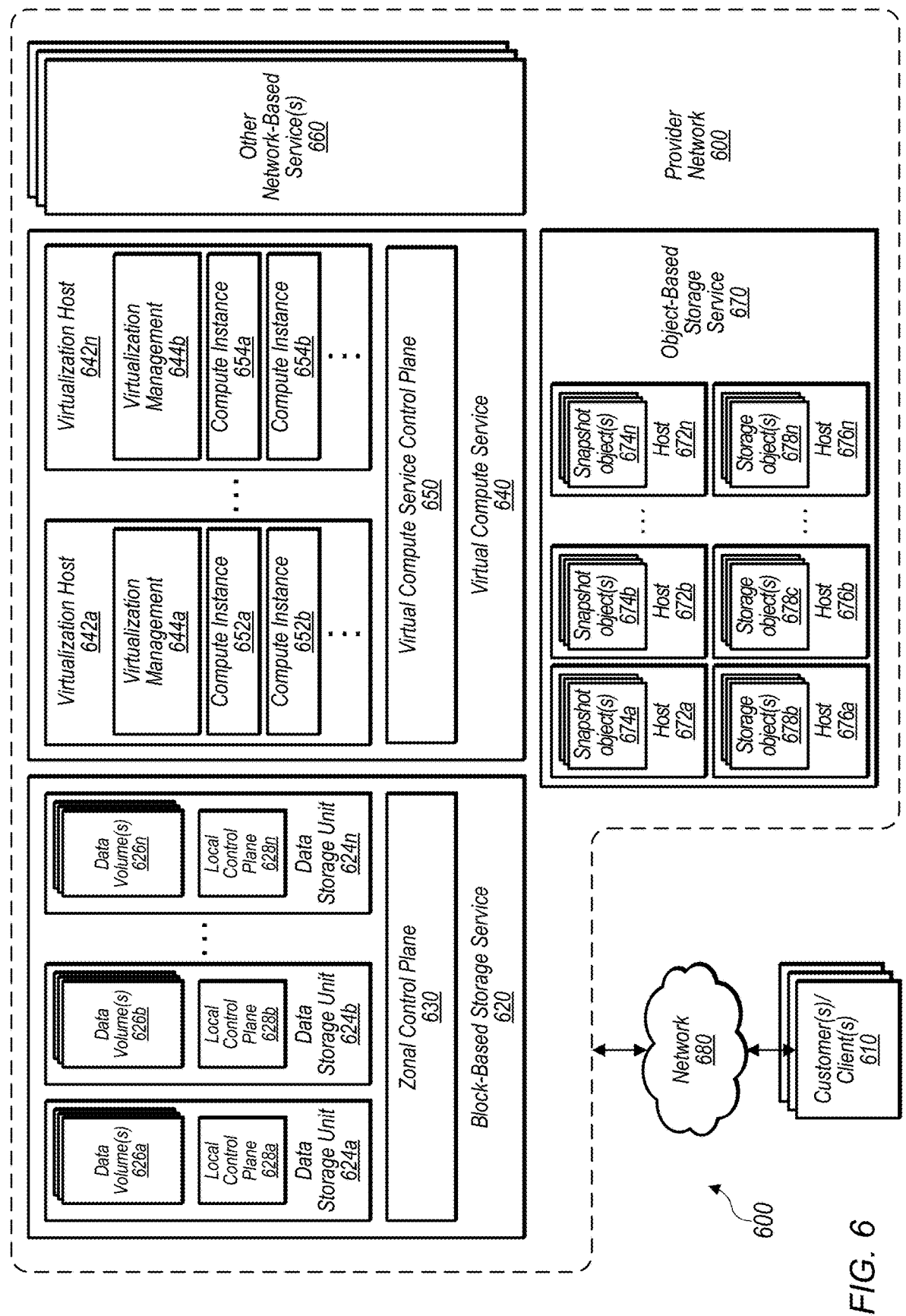
FIG. 6 is a block diagram illustrating a provider network implementing multiple network-based services including a block-based storage service that includes data storage units of a data storage system, and also including an object-based storage service that stores snapshot objects, according to some embodiments.

As an example, data storage system 100 may store a block-based storage volume for a compute instance of a computing service, such as virtual compute service 640 described in regard to FIG. 6. In some embodiments, a snapshot object 124 stored in additional data storage system 120 may be provided to data storage system 100 as a boot volume to be used by a compute instance attached to the block-based storage volume implemented by the data storage system 100. Initially the volume data stored for the block-based storage volume in storage 108 of head node 104 and the snapshot object 124 stored in host 122 of additional data storage system 120 may be the same. In such circumstances, chunks of the block-based storage volume stored in storage 108 of head node 104 may be considered "clean" chunks. For example, head node 104 may maintain metadata for the chunks of the block-based storage volume indicating that the chunks were populated with data from a snapshot stored in additional data storage system 120 and have not been modified to deviate from the snapshot.

When a flush trigger is reached, e.g. an amount of volume data stored in storage 108 of head node 105 exceeds a threshold amount, an amount of time the volume data has been stored in the storage 108 of head node 104 exceeds a threshold, or some other flush trigger has been met, the head node 104 may cause the chunks of volume data to be flushed from the storage 108 of the head node 104 to the mass storage devices 116 of the sleds 112. In order to meet a customer durability guarantee various striping and/or erasure encoding formats may be used for the flushed volume data.

In the example of volume data stored in storage 108 from a snapshot object 124, wherein the volume data has not been changed (e.g. the chunks of volume data are considered "clean") and snapshot optimization is enabled, a first data striping and/or erasure encoding scheme may be used. Additionally, if the volume data has been changed (e.g. the chunks of volume data are considered "dirty") or snapshot optimization is not enabled a different data striping and/or erasure encoding scheme may be used. For example, a modifying operation may have been committed in the data storage system 100, such as write request 102, such that the volume data stored in storage 108 no longer matches the snapshot copy 124 stored in host 122 of additional data storage system 120. While this example has discussed a boot volume being populated from a snapshot object 124, note that in other embodiments, a volume may be restored to a snapshot other than a boot volume snapshot, such as point-in-time snapshot or other snapshot.

Continuing the example, if the volume data has not been changed, e.g. the volume data is the same as the snapshot object 124, then the data storage system 100 can tolerate at least some loss of volume data without losing customer data because any lost volume data can be restored from the snapshot object 124. In such circumstances, storage resource utilization of data storage system 100 may be optimized (e.g. snapshot optimization may be enabled) to reduce a number of redundant or partially redundant copies of the volume data that are stored in data storage system 100 since the volume data is also durably stored in additional data storage system 120. However, if the volume data has been changed from the snapshot object 124 or if a snapshot object 124 does not exist for the volume data, the data storage system 100 cannot tolerate loss of volume data without also losing customer data. Thus, for such chunks of volume data for which a complete copy is not stored in additional data storage system 120, the data storage system 100 may store redundant and/or partially redundant copies of the volume data, such that a loss of a redundant or partially redundant copy of the volume data does not result in loss of customer data.

Further continuing the example, as shown in FIG. 1A volume data may be stored on different ones of the mass storage devices 116 in different ones of the sleds 112 as part of performing a flush operation. If the volume data is not also stored in additional data storage system 120, redundant copies or parity partitions may be stored as part of performing the flushing operation. However, if the volume data is additionally stored in additional storage system 120 and snapshot optimization is enabled the volume data may be stored in mass storage devices 116 without redundant copies and parity partitions or with fewer redundant copies or fewer parity partitions. For example, for a chunk of volume data stored in a mass storage device 116 of sled A of shelf 1, if the mass storage device 116 were to fail, the volume data may be restored from a redundant copy or parity partition stored on different ones of the mass storage devices 116 of the sleds 112. If a redundant copy of the chunk of volume data stored on the failed mass storage device 116 of sled A of shelf 1 is not stored on other ones of the mass storage devices of other ones of the shelfs (as may be the case for a "clean" chunk when snapshot optimization is enabled) the volume data may be restored from the snapshot object 124 stored in host 122, which has a separate independent failure domain from the mass storage devices 116 of sleds 112. Also, it is worth noting that the shelves and data storage sleds may also have independent failure domains, such that a failure of a component in one of the shelves or sleds does not necessarily cause failures in other ones of the shelves or sleds.

As can be seen, storage space optimization may be achieved by taking into account whether or not a complete copy of volume data being flushed from storage 108 of head node 104 to the mass storage devices 116 of sleds 112 is also stored as a snapshot object 124 in host 122 of additional data storage system 120. If a complete copy is additionally stored in the additional data storage system 120 fewer partitions/parity partitions for the chunk of data being flushed may be stored in the mass storage devices 116 of the sleds 112 without sacrificing an ability to meet a durability guarantee for the volume data and at the same time using fewer storage resources (e.g. storage space on the mass storage devices 116) than would be the case if such considerations were not taken into account. Thus snapshot optimization may reduce an amount of storage resource required to store customer data without sacrificing an ability to meet a durability guarantee for the customer data.

Figure 1B:
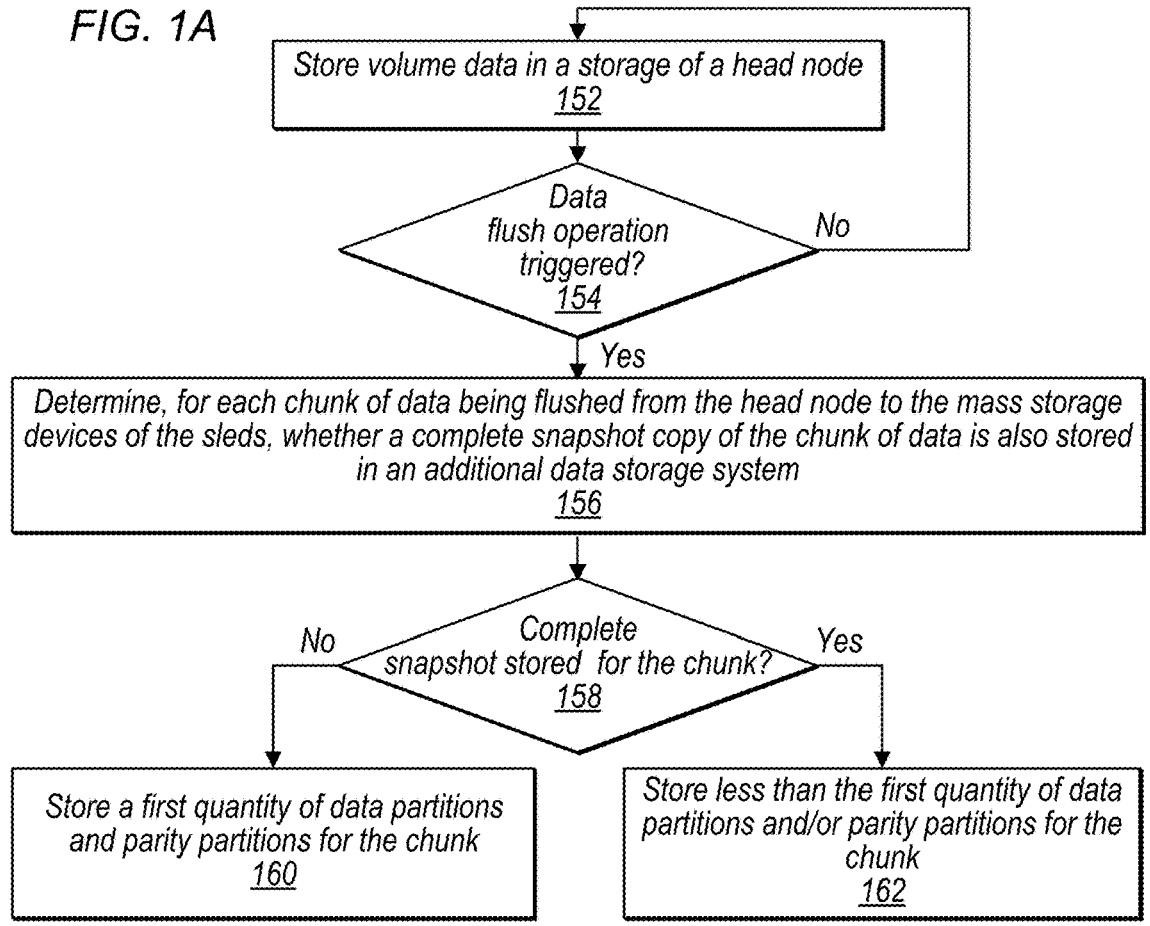
FIG. 1B is a flowchart illustrating operations performed by a head node to store volume data to mass storage devices of a data storage system, wherein a quantity of data partitions to be stored for a chunk of data is determined based on whether or not a complete copy of the chunk of data is also stored in an additional storage system, according to some embodiments.

FIG. 1B is a flowchart illustrating operations performed by a head node to store volume data to mass storage devices of a data storage system, wherein a quantity of data partitions to be stored for a chunk of data is determined based on whether or not a complete copy of the chunk of data is also stored in an additional storage system, according to some embodiments.

For example at 152, a head node, such as head node 104, stores volume data in a storage of the head node, such as storage 108. The volume data may include data stored to the head node from a snapshot copy, such as snapshot object 124, and/or may include other volume data such as write data from write request 102.

At 154, the head node may determine whether or not a data flush operation has been triggered. In some embodiments, a threshold to trigger data to be flushed may include: an amount of data stored in a log of the head node or in a segment of the log, an amount of time that has elapsed since the data was last accessed or altered, a frequency at which the data is accessed or altered, or other suitable thresholds. In some embodiments, data flushed from a head node may only include a portion of the data written to a log of the head node or a segment of the log of the head node. For example, older data stored in a log of a head node may be flushed while more recently written data may remain in the log of the head node. In some embodiments, a frequency of flush operations from a log of a head node may be throttled based on a variety of factors, such as a fill rate of the log of the head node or based on an amount of write requests being received by the head node or being received for a particular volume serviced by the head node.

If it is determined at 154 that a data flush operation has not been triggered, the head node may continue to store volume data in the storage of the head node.

If it is determined at 154, that a data flush operation has been triggered and snapshot optimization is enabled, at 156 the head node may determine for each chunk of volume data being flushed from the head node to mass storage devices, such as mass storage devices 116, whether or not a complete snapshot copy of the chunk of data is also stored in an additional data storage system, such as additional data storage system 120. In some embodiments, the head node may maintain metadata for the chunks of volume data that may be consulted to determine whether or not a complete snapshot copy of the chunk of data is also stored in the additional data storage system. For example, FIG. 1C further discusses operations that a head node may perform to maintain metadata for data chunks stored in data storage system, wherein the metadata indicates whether or not a complete copy of the chunk is also stored in an additional data storage system.

At 158, the head node decides which data partition/ erasure encoding scheme to use when storing volume data for a given chunk of volume data based on whether or not a complete snapshot for the given chunk of volume data is also stored in an additional data storage system.

At 160, if it is determined that a complete copy is not stored in an additional data storage system, the head node stores the chunk of volume data using a first quantity of data partitions and/or parity partitions. However, if it is determined that a complete copy of the volume data of the chunk is also stored in an additional data storage system, at 162, the head node stores the chunk of volume data using fewer data partitions or parity partitions than the first quantity. In such cases different erasure encoding schemes may be used to result in different quantities of parity partitions to be stored for a given chunk. Also, in some embodiments, erasure encoding may not be used to reduce a number of partitions to be stored for a chunk of volume data that has a complete copy also stored in an additional data storage system. As yet another example, in some embodiments, volume data for chunks that have complete copies stored in additional data storage system may not be stored to the mass storage devices of the data storage system. For example, in such an embodiment zero data partitions or parity partitions may be stored to the mass storage devices for "clean" chunks. However, in other embodiments at least some data partitions and/or parity partitions may be stored to the mass storage devices for both "clean" and "dirty" chunks wherein fewer data partitions and parity partitions are stored for the "clean" chunks.

FIG. 1C is a flowchart illustrating operations performed by a head node to maintain metadata for chunks of a volume, wherein the metadata is used to determine whether or not a complete copy of the chunks of data are also stored in an additional storage system according to some embodiments.

At 172 a head node maintains metadata for data chunks stored in the data storage system, wherein the metadata indicates whether or not a complete copy of the chunk is also stored in an additional data storage system, such as additional data storage system 120. In some embodiments, maintaining the metadata may comprise steps 174, 176, and 178 as described in FIG. 1C.

At 174, the head node stores a "clean" flag for data chunks added to a volume from a snapshot copy, wherein the "clean" flag indicates that there is a snapshot copy stored for the data chunks in an additional data storage system, such as additional data storage system 120.

At 176, in response to committing one or more modifying operations in the data storage system that modify data stored in one or more of the chunks marked by the "clean" flag, the head node updates the metadata to indicate a "dirty" flag for chunks for which data has been modified.

At 178, in response to an additional snapshot being created and stored in the additional data storage system for the volume, or a portion of the volume, the head node updates the metadata for chunks included in the additional snapshot such that the affected chunks are marked with a "clean" flag.

Thus, when the head node determines at 156 and 158 whether a complete snapshot copy of the chunk of data is also stored in an additional data storage system, the head node may make the determination based on a flag included in the maintained metadata for the respective chunk.

Figure 2:
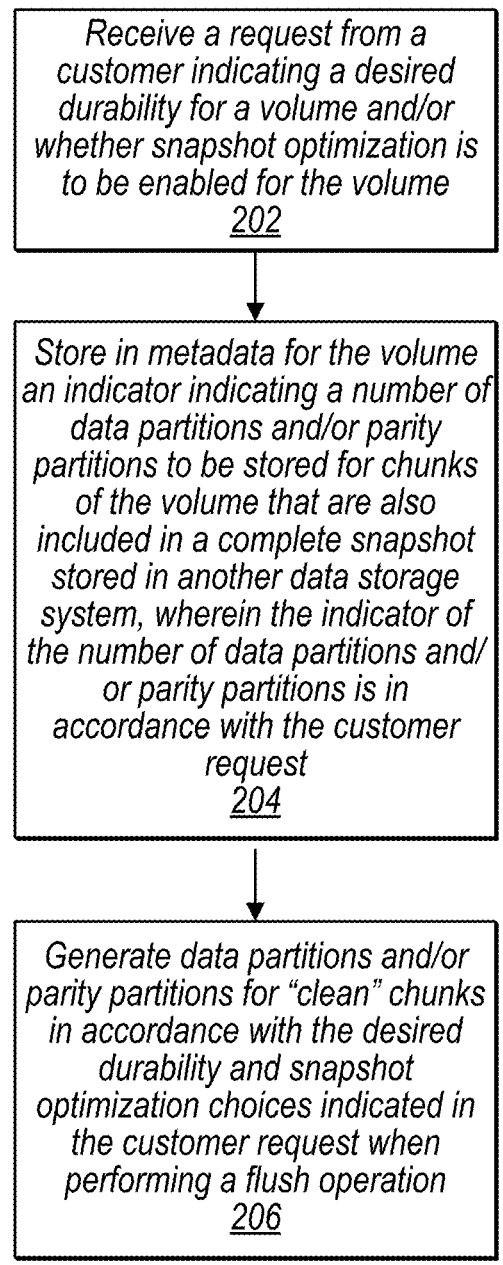
FIG. 2 is a flowchart illustrating a data storage system customizing durability requirements and/or snapshot optimization data storage requirements for a volume based on a customer selection, according to some embodiments.

FIG. 2 is a flowchart illustrating a data storage system customizing durability requirements and/or snapshot optimization data storage requirements for a volume based on a customer selection, according to some embodiments.

Figure 4:
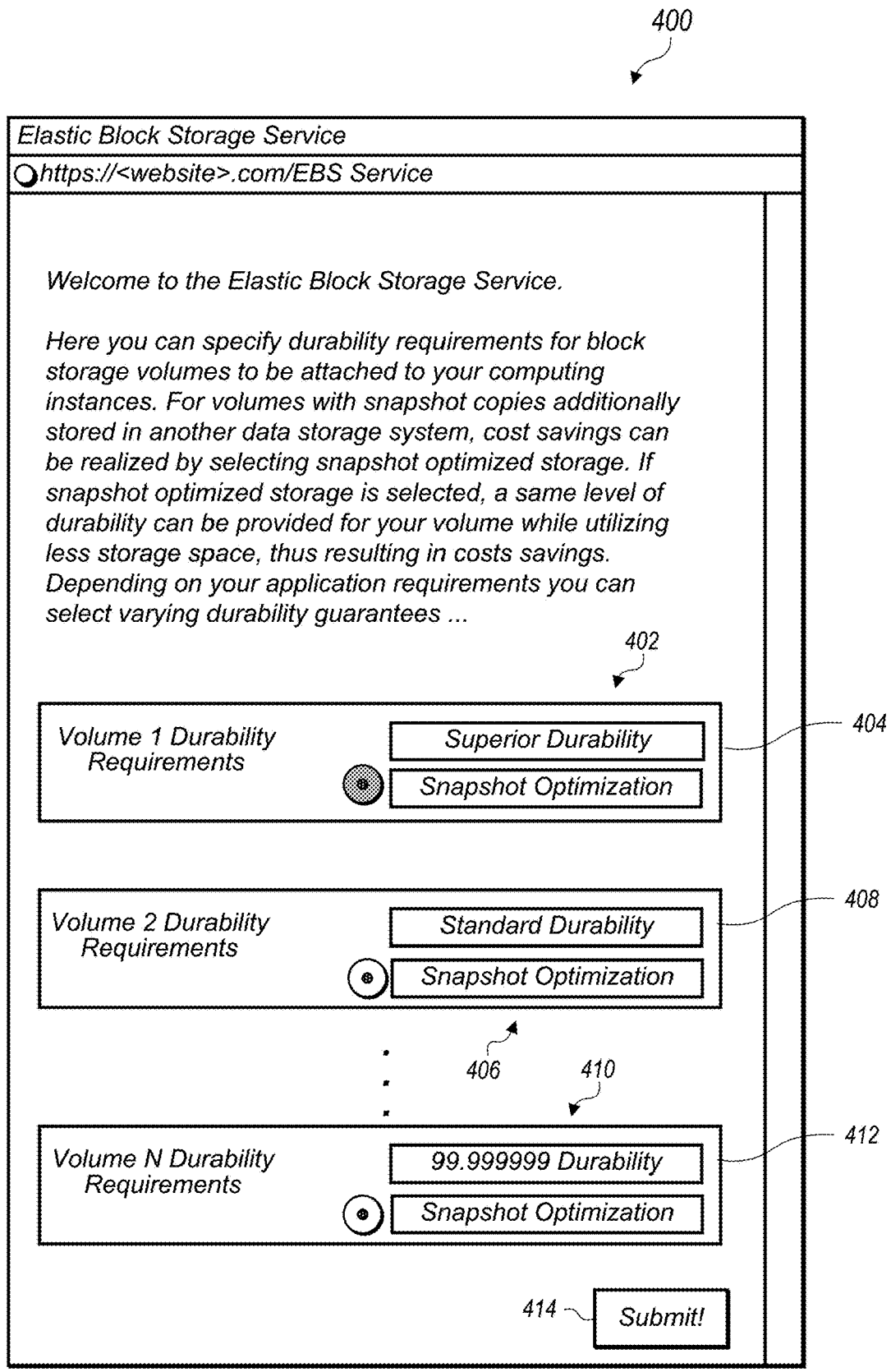
FIG. 4 illustrates an example user interface that may be provided to a customer of a data storage system in order to select a durability requirement for a volume stored, or to be stored, in the data storage system and to further select whether snapshot optimization is to be enabled for the volume, according to some embodiments.

At 202 a control plane of a data storage system receives a request from a customer indicating a desired durability for a volume and/or whether snapshot optimization is to be enabled for the volume. For example, the request may be received via a user interface as illustrated in FIG. 4 or via another suitable interface to the data storage system.

At 204, the control plane causes a head node to store an indicator in metadata for the volume indicating a number of data partitions and/or parity partitions to be stored for chunks of the volume that are also included in a complete snapshot stored in another data storage system, wherein the indicator of the number of data partitions and/or parity partitions is in accordance with the customer request. In some embodiments, the control plane may provide the indicator in the form of different partitioning/erasure encoding schemes to be used when flushing "clean" and "dirty" chunks. In some embodiments, the indication may be provided as a durability requirement and an indication as to whether or not snapshot optimization is enabled. In such embodiments, the head node may determine which partitioning/erasure encoding schemes to use for "clean" chunks and "dirty" chunks in order to meet the durability requirement while implementing snapshot optimization.

At 206, the head node generates data partitions and/or parity partitions for "clean" chunks in accordance with the desired durability and snapshot optimization choices indicated in the customer request when performing a flush operation.

Figure 3A:
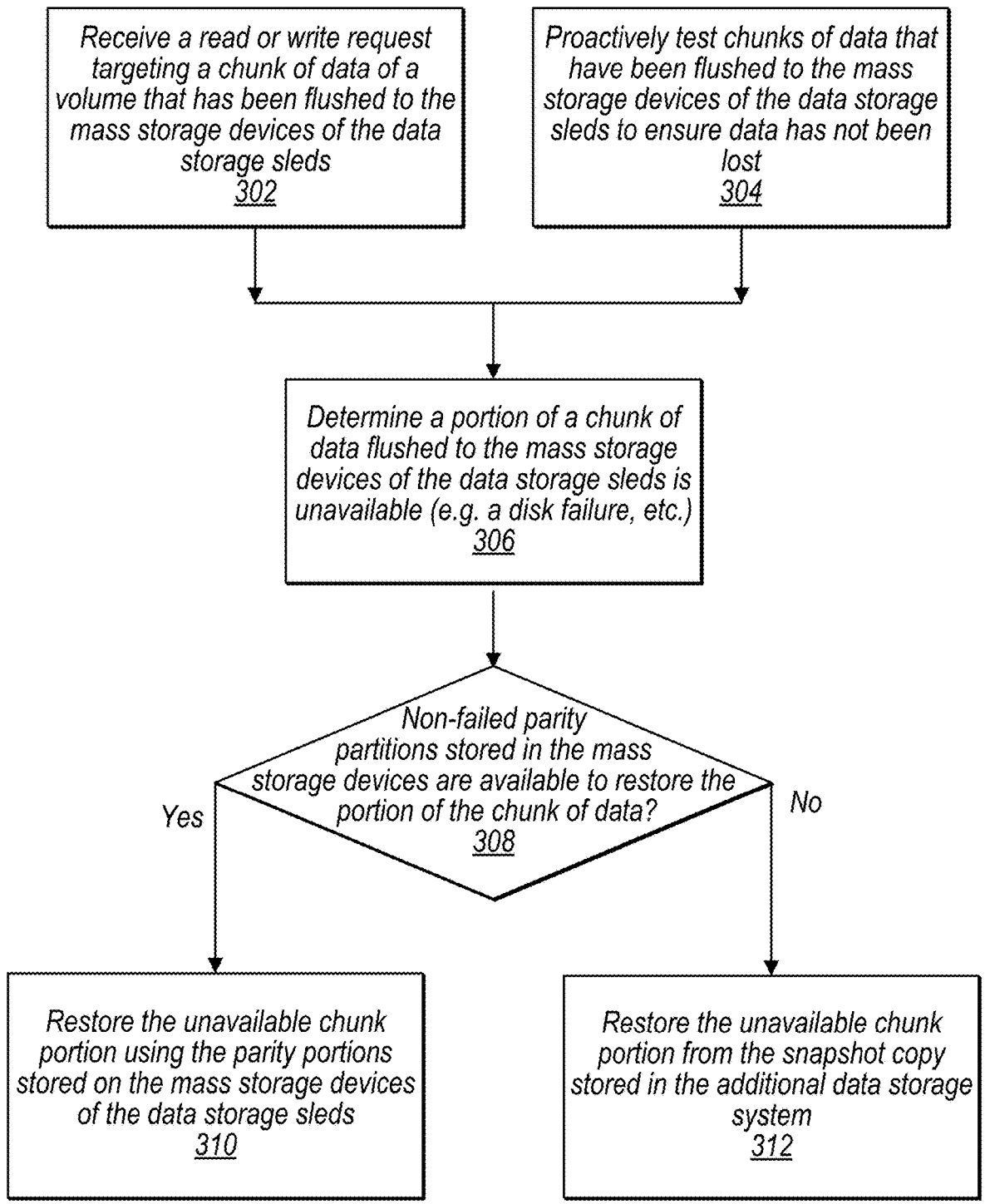
FIG. 3A is a flowchart illustrating a head node restoring volume data stored in mass storage devices of a data storage system in response to a failed or non-responsive mass storage device of the data storage system, wherein the data is restored either from parity data stored on other mass storage devices of the data storage system or is restored from a snapshot copy stored in another data storage system, according to some embodiments.

FIG. 3A is a flowchart illustrating a head node restoring volume data stored in mass storage devices of a data storage system in response to a failed or non-responsive mass storage device of the data storage system, wherein the data is restored either from parity data stored on other mass storage devices of the data storage system or is restored from a snapshot copy stored in another data storage system, according to some embodiments.

At 302, a head node receives a read or write request targeting a chunk of data of a volume that has been flushed to the mass storage devices of the data storage sleds. Additionally or alternatively, at 304 the head node or another component of the data storage system implements a scrubber that proactively tests chunks of data that have been flushed to the mass storage devices of the data storage sleds to ensure data has not been lost.

At 306, it is determined that a portion of a chunk of data flushed to the mass storage devices of the data storage sleds is unavailable. For example, a chunk of volume data may have been stored using a 4+2 erasure encoding scheme wherein four data partitions are stored on four different mass storage devices and two parity partitions are stored on two additional mass storage devices. In such an example, one of the mass storage devices may have failed or may be unresponsive such that three out of the four data partitions are available or one of the two parity partitions are available. As another example, a chunk of volume may have been stored using four data partitions without storing a parity partition, for example in the case of a "clean" chunk with snapshot optimization enabled. In such an example, one of the mass storage devices storing one of the four data partitions may have failed or other may be unavailable.

At 308, the head node that is designated as a primary head node for the volume partition of which the unavailable portion is a part, determines whether or not non-failed parity partitions (or replicas) are stored in the mass storage devices of the data storage system such that the lost portion can be recreated from the non-failed parity partitions (or replicas).

If so, at 310, the head node designated as the primary head node restores the unavailable chunk portion using the parity portions stored on the mass storage devices of the data storage sleds.

If not, at 312, the head node designated as the primary head node restores the unavailable chunk portion from the snapshot copy stored in the additional data storage system.

Figure 3B:
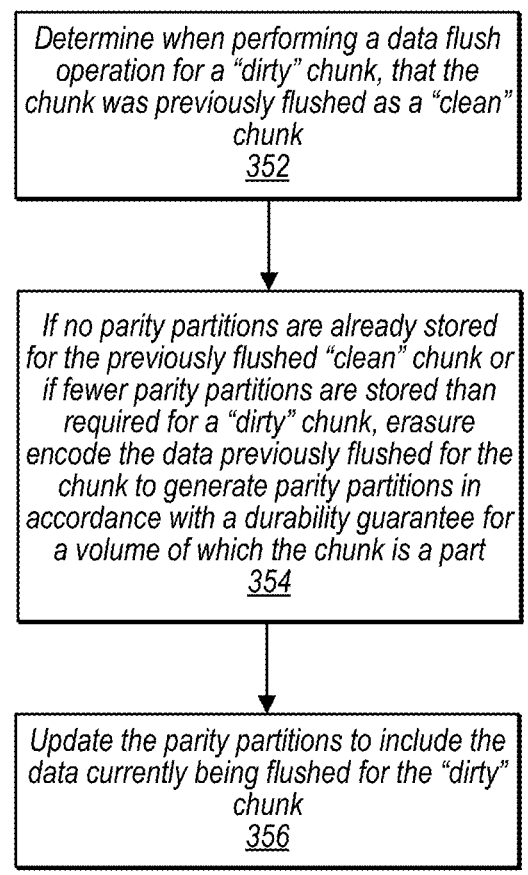
FIG. 3B is a flowchart illustrating a head node storing data to mass storage devices of a data storage system for a chunk of volume data that was previously stored to the mass storage devices without storing parity partitions or with fewer parity partitions than a current durability requirement, according to some embodiments.

FIG. 3B is a flowchart illustrating a head node storing data to mass storage devices of a data storage system for a chunk of volume data that was previously stored to the mass storage devices without storing parity partitions or with fewer parity partitions than a current durability requirement, according to some embodiments.

At 352, a head node performing a flushing operation determines for a "dirty" chunk the volume data of the dirty chunk has been previously flushed to the data storage sleds, and if so if the currently "dirty" chunk was previously flushed as a "clean" chunk. In some embodiments, this determination may include comparing a data partition scheme/erasure encoding scheme applicable to "dirty" chunks to data partitions and/or parity partitions previously stored for the chunk. For example, if the data partition scheme/erasure encoding scheme being used for "dirty" chunks requires 4+2 erasure encoding and the data partition scheme/erasure encoding scheme being used for "clean" chunks does not require erasure encoding or requires fewer than two parity partitions, the head node may compare the stored parity partitions for the chunk to the required parity partitions required for a "dirty" chunk to determine that the chunk was previously flushed as a "clean" chunk.

At 354, if no parity partitions are already stored for the previously flushed "clean" chunk or if fewer parity partitions are stored than required for a "dirty" chunk, the head node erasure encodes the data previously flushed for the chunk to generate parity partitions in accordance with a durability guarantee required for "dirty" chunks for a volume of which the chunk is a part. For example, if the data partition scheme/erasure encoding scheme being used for "dirty" chunks requires 4+2 erasure encoding and the chunk was previously flushed without erasure encoding, the head node may generate a 4+2 erasure encoding of the previously flushed data. In some embodiments, the data storage system may utilize a copy forward approach, wherein the 4+2 erasure encoded data is saved to new location on the mass storage devices and the previously stored data partitions without erasure encoding are marked for garbage collection, wherein the garbage collection will release the storage space to be re-used to store volume data for future flush operations.

At 356, the head node updates newly generated parity partitions to include the data currently being flushed for the "dirty" chunk.

FIG. 4 illustrates an example user interface that may be provided to a customer of a data storage service in order to select a durability requirement for a volume stored, or to be stored, in the data storage service, according to some embodiments.

In some embodiments, an interface to a block data storage service implemented using a data storage system, such as interface 400 may allow a customer or client to specify a durability requirement for a volume to be allocated for the client in the block data storage service and also an option to enable snapshot optimization. While FIG. 4 illustrates a graphical user interface, in some embodiments, a block data storage service may include other types of interface for receiving a customer or client durability requirement for a volume and/or an indication to enable snapshot optimization, such as an application programmatic interface (API), command line interface, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In some embodiments, an interface, such as interface 400, may include multiple volume request spaces, such as volume request spaces 402, 406, and 410 for volumes that the customer or client requests to be implemented for the client. Additionally, in some embodiments, a user interface, such as interface 400, may include durability selection areas, such as durability selection areas 404, 408, and 412, in the respective volume request spaces 402, 406, and 410. In some embodiments, a customer or client may select from a pre-defined set of durability requirements, such as standard durability, enhanced durability, superior durability, minimal durability, etc. In some embodiments, a customer or client may specify a durability requirement such as "5-9s" durability or a guarantee that 99.99999% of the client's data will not be lost. Also, in some embodiments, a customer may specify whether or not snapshot optimization is to be enabled for the customer's volume. Also, in some embodiments an interface, such as interface 400, may include a submit button 414 to cause the requested volumes to be implemented with the specified durability characteristics and snapshot optimization selections.

While not shown in FIG. 4, in some embodiments, a customer may be able to modify a durability requirement or snapshot optimization selection for an already implemented volume.

Figure 5:
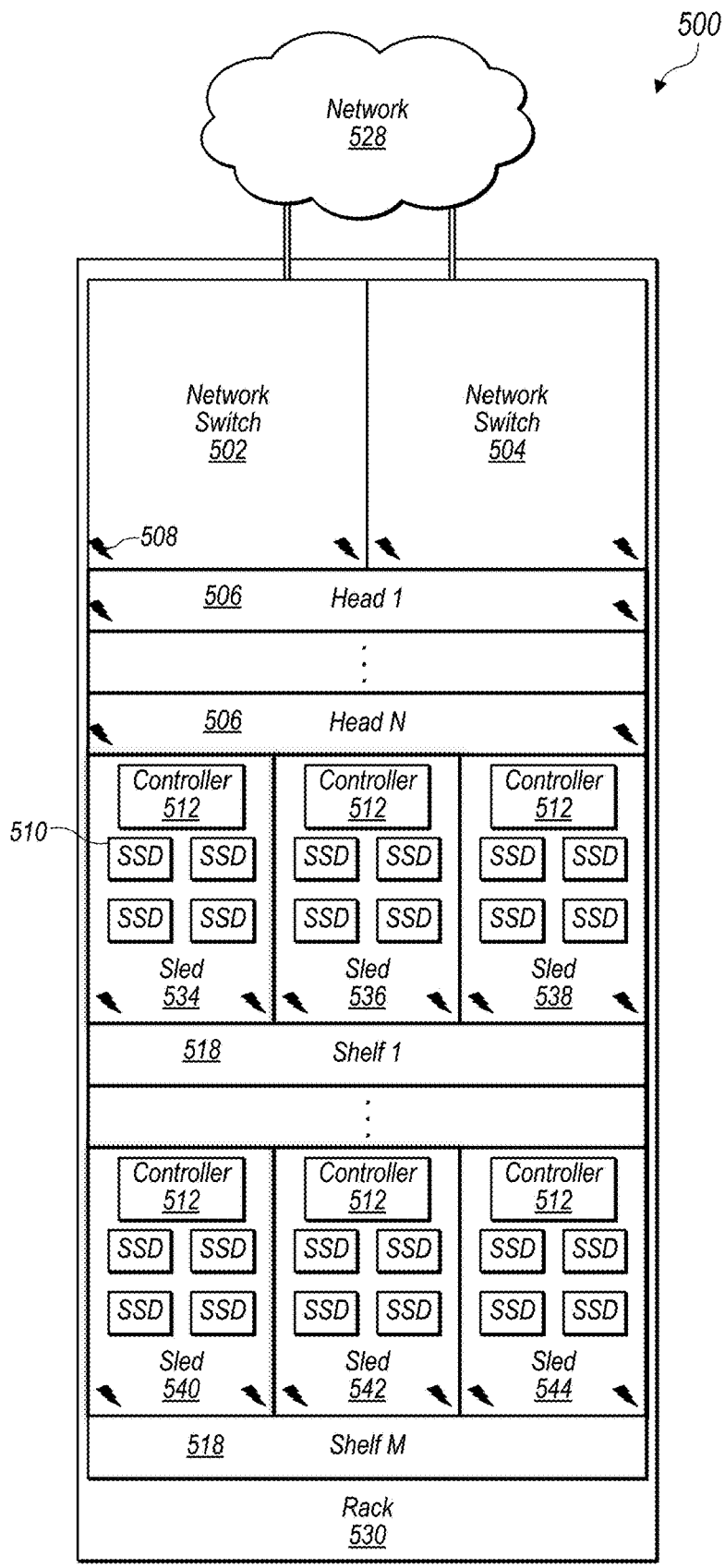
FIG. 5 illustrates an example data storage unit comprising multiple head nodes and data storage sleds, which may be included in a data storage system, according to some embodiments.

FIG. 5 illustrates a data storage unit comprising head nodes and data storage sleds, according to some embodiments. Data storage unit 500, which may be included in a data storage system, includes network switches 502 and 504, head nodes 506 and data storage sleds 534-544 on shelves 518. Each data storage sled 534-544 includes a sled controller 512 and mass storage devices 510. The head nodes 506, data storage sleds 534-544, and network switches 502 and 504 are mounted in rack 530. In some embodiments, networking devices, such as network switches 502 and 504, may be mounted in a position adjacent to and external from a rack of a data storage unit, such as rack 530 of data storage unit 500. A data storage unit may have redundant network connections to a network external to the data storage unit, such as network 528 that is connected to both network switch 502 and network switch 504. In some embodiments, components of a data storage unit, such as network switches 502 and 504, head nodes 506, and data storage sleds 534-544 may be connected to redundant power sources. For example, power connections 508 indicate power connections for network switches 502 and 504, head nodes 506, and data storage sleds 534-544. Note that power connections 508 are illustrated as a power symbol for simplicity of illustration, but may include various types of power connectors and power distribution systems. For example, power connectors of data storage unit components, such as head nodes and data storage sleds, may couple to dual power distribution systems within a data storage unit that receive power from dual power sources. In some embodiments, a data storage unit may include more than two redundant power distribution systems from more than two redundant power sources.

Each head node of a data storage unit, such as each of head nodes 506, may include a local data storage and multiple network interface cards. For example, a head node may include four network ports, wherein two network ports are used for internal communications, such as one network card being used for communications with other head nodes of a data storage unit and another network card being used for communications with other data storage sleds of a data storage unit, such as data storage sleds 534-544, and two of the network ports are used for external communications, for example via network 528. In some embodiments, each head node may be assigned two publicly routable network addresses that are routable from client devices in network 528 and may also be assigned two local network addresses that are local to a data storage unit and are routable for communications between the head node and data storage sleds of the data storage unit. Thus, a data storage unit, such as data storage unit 500, may include multiple redundant networks for communications within the data storage unit. In some embodiments, publicly routable network addresses may be used for internal communications between head nodes and data storage sleds and a head node may be assigned four publicly routable network addresses that are routable from client devices in network 528. The data storage unit may also include redundant power distribution throughout the data storage unit. These redundancies may reduce risks of data loss or downtime due to power or network failures. Because power and network failure risks are reduced via redundant power and network systems, volumes may be placed totally or at least partially within a single data storage unit while still meeting customer requirements for reliability and data durability.

Also, one or more head nodes of a data storage unit, such as one or more of head nodes 506, may function as a head node and additionally implement a local control plane for a data storage unit. In some embodiments, a local control plane may be implemented in a logical container separate from other control and storage elements of a head node. A local control plane of a data storage unit may select amongst any of the head nodes, such as any of head nodes 506, of the data storage unit when selecting a head node to designate as a primary head node for a volume or volume partition and may select amongst any of the remaining head nodes of the data storage unit when selecting one or more head nodes to designate as reserve or secondary head nodes for the volume or volume partition. For example a first one of head nodes 506 may be designated as a primary head node for a volume or volume partition and any of the remaining head nodes 506 may be selected as reserve head nodes for the volume or volume partition. In some embodiments, a given one of the head nodes 506 may be designated as a primary head node for a given volume or volume partition and may also be designated as a reserve head node for another volume or volume partition.

Additionally, any head node may be assigned or select columns of space on mass storage devices in any of the data storage sleds of a data storage unit for storing flushed data for a particular volume or volume partition. For example, any of head nodes 506 may reserve columns of space in mass storage devices 510 in any of data storage sleds 534-544. However, any particular column of space of a mass storage device may only be assigned to a single volume or volume partition at a time.

Because multiple head nodes and multiple data storage sleds are available for selection, and because each volume partition may be assigned two or more reserve head nodes (also referred to herein as secondary head nodes), a failure of a particular head node or a failure of a mass storage device in a particular data storage sled may not significantly reduce durability of data stored in the data storage unit. This is because, upon failure of a head node, a local control plane may designate another head node of the data storage unit to function as a replacement reserve head node for a volume or volume partition. Thus, for volumes that are stored using three or more head nodes to store three or more replicas (e.g.

a primary replica and two or more reserve replicas) the volume is only without a secondary head node if two or more of the reserve head nodes for the volume fail, and in that rare circumstance, the volume is only without a secondary head node for a short period of time during which a replacement reserve head node is being designated and volume data is being re-mirrored from the primary head node to the replacement reserve head node. Furthermore, when a head node of a data storage unit fails, other head nodes of the data storage unit may still be able to access data in all of the storage sleds of the data storage unit. This is because no single data storage sled is exclusively assigned to any particular head node, but instead columns of space on individual mass storage devices of the data storage sleds are assigned to particular head nodes for particular volumes or volume partitions. This arrangement greatly reduces the blast radius of a head node failure or a disk failure as compared to other storage systems in which each server has a dedicated set of storage devices.

As discussed in more detail below, in some embodiments, a head node or local control plane of a data storage unit may be configured to re-create data stored on mass storage devices that are located in a data storage sled to other mass storage devices in other data storage sleds. Thus, for example, when a data storage sled with a failed mass storage device is removed from a data storage unit for replacement or repair, data from one or more non-failed mass storage devices in a data storage sled may still be available because the data has been re-created and stored to other data storage sleds of the data storage unit. For example, if a single mass storage device 510 in data storage sled 534 failed, data stored in the remaining mass storage devices 510 of data storage sled 534 may be replicated to mass storage devices 510 in any of data storage sleds 536-544. Thus while data storage sled 534 is removed from data storage unit 500 for repair or replacement of the failed mass storage device 510, data previously stored on the non-failed mass storage devices 510 of data storage sled 534 may still be available to head nodes 506.

Also, in some embodiments, a head node or local control plane of a data storage unit may be configured to re-create data stored on mass storage devices that are located in a data storage sled from a snapshot copy stored in an additional data storage service.

Also, a data storage unit, such as data storage unit 500, may perform read and write operations independent of a zonal control plane. For example, each of head nodes 506 may be assigned one or more network addresses, such as IP addresses, that are advertised outside of data storage unit 500. Read and write requests may be routed to individual head nodes at the assigned network addresses of the individual head nodes via networking devices of the data storage unit, such as network switches 502 and 504, without the read and write requests being routed through a control plane external to the data storage unit, such as a control plane external to data storage unit 500.

In some embodiments, a data storage sled, such as one of data storage sleds 534-544, may include a sled controller, such as one of sled controllers 512. A sled controller may present the mass storage devices of the data storage sled to the head nodes as storage destination targets. For example head nodes and data storage sleds may be connected over an Ethernet network. In some embodiments, head nodes, such as head nodes 506 may communicate with mass storage devices 510 and vice versa via sled controllers 512 using a Non-volatile Memory Express (NVMe) protocol, or other suitable protocols. In some embodiments, each head node may be assigned multiple private network addresses for communication with data storage sleds over redundant internal Ethernet networks internal to a data storage unit. In some embodiments, a head node at an I/O processing software layer may perform a local disk operation to write or read from a mass storage device of a data storage sled and another software layer of the head node may encapsulate or convert the I/O operation into an Ethernet communication that goes through a networking device of the data storage unit to a sled controller in one of the data storage sleds of the data storage unit. A network interface of a head node may be connected to a slot on a motherboard of the head node, such as a PCIe slot, so that the mass storage devices of the data storage sleds appears to the operating system of the head node as a local drive, such as an NVMe drive. In some embodiments, a head node may run a Linux operating system or other type of operating system. The operating system may load standard drivers, such as NVMe drivers, without having to change the drivers to communicate with the mass storage devices mounted in the data storage sleds.

In some embodiments, a local control plane may be configured to designate more than one head node as a reserve/secondary head node for a volume or a volume partition and also adjust a number of mass storage devices that make up an erasure encoded RAID array for longer term storage of data for the data volume or volume partition. Thus if increased durability is desired for a particular volume or volume partition, the volume data may be replicated on "N" head nodes and subsequently stored across "M" mass storage devices in data storage sleds of the data storage unit, wherein the number "N" and the number "M" may be adjusted to achieve a particular level of durability. Also, the number "M" may be adjusted based on whether or not snapshot optimization has been enabled for the volume and whether or not a complete copy of a chunk of volume data of the volume is also stored in additional data storage system. In some embodiments, such an arrangement may allow high levels of durability to be realized for a data volume.

Also, a given head node may be designated as a primary head node or a reserve head node for multiple volumes. Furthermore, a zonal control plane of a data storage system or a local control plane of a data storage unit may balance volume placement across head nodes of a data storage unit. Because volumes are distributed amongst the head nodes, variations in peak IOPS to average IOPS may be reduced because while one volume may experience peak load other volumes serviced by a particular head node may experience less than peak IOPS load. In a similar manner, background bandwidth usage may be distributed, for example such that re-mirroring tasks are distributed amongst multiple head nodes instead of being concentrated on a single head node. For example, if a head node fails the head node may have stored replicas of volume partitions for which surviving replicas are distributed across multiple ones of the remaining head nodes. Thus the re-mirroring tasks also will be distributed across the multiple ones of the head nodes. In some embodiments, a zonal or local control plane may adjust head node designations or volume assignments to balance loads if volumes on a particular head node experience significantly more IOPS than volumes serviced by other head nodes.

While, FIG. 5 illustrates mass storage devices 510 as solid state drives, any suitable storage device may be used. For example, in some embodiments, mass storage devices 510 may include hard disk drives. Also, FIG. 5 illustrates networking devices 502 and 504 to be networking switches.

However, in some embodiments, other suitable networking devices may be used such as routers, etc.

In some embodiments, a data storage unit, such as data storage unit 500, may be part of a data storage system included in a larger provider network system. Also, in some embodiments more than one data storage unit may be included in a data storage system used to implement a block storage service of a provider network. For example, FIG. 6 illustrates such an example provider network, according to some embodiments.

FIG. 6 is a block diagram illustrating a provider network 600 that includes multiple network-based services such as a block-based storage service that implements dynamic resource creation to connect with customer resources, according to some embodiments. Provider network 600 may be set up by an entity such as a company or a public sector organization to provide one or more services (such as various types of cloud-based computing or storage) accessible via the Internet and/or other networks to customers 610. Provider network 600 may be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Customers 610 may access these various services offered by provider network 600 via network 680. Likewise network-based services may themselves communicate and/or make use of one another to provide different services. For example, computing resources offered to customers 610 in units called "instances," such as virtual or physical compute instances, may make use of particular data volumes 626, providing virtual block-based storage for the compute instances. Also, note that any of the data storage units 624*a*, 624*b*, 624*n* may be data storage units such as data storage unit 500 illustrated in FIG. 5, which may be part of a data storage system as described in FIGS. 1-4.

As noted above, virtual compute service 640 may offer various compute instances, such as compute instances 654*a* and 654*b* to customers 610. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 640 in different embodiments, including special purpose computer servers, storage devices, network devices and the like. In some embodiments instance customers 610 or any other user may be configured (and/or authorized) to direct network traffic to a compute instance. In various embodiments, compute instances may mount, connect, attach or map to one or more data volumes 626 provided by block-based storage service 620 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing customer applications, without for example requiring the customer 610 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 6, a virtualization host, such as virtualization hosts 642a and 642n, may implement and/or manage multiple compute instances 652a, 652b, 654a, and 654b respectively, in some embodiments, and may be one or more computing devices, such as computing device 1300 described below with regard to FIG. 13. Virtualization hosts 642 may also provide multi-tenant hosting of compute instances. For example, in some embodiments, one virtualization host may host a compute instance for one entity (e.g., a particular customer or account of virtual computing service 610), while another compute instance hosted at the same virtualization host may be hosted for another entity (e.g., a different account). A virtualization host may include a virtualization management module, such as virtualization management modules 644a and 644b capable of instantiating and managing a number of different customer-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by customers on whose behalf the compute instances run, but may instead be responsible for various administrative or control-plane operations of the network provider, including handling the network traffic directed to or from the compute instances.

Virtual computing service 640 may implement control plane 650 to perform various management operations. For instance, control plane 650 may implement resource management to place compute instances, and manage the access to, capacity of, mappings to, and other control or direction of compute instances offered by provider network. Control plane 650 may also offer and/or implement a flexible set of resource reservation, control and access interfaces for customers 610 via an interface (e.g., API). For example, control plane 650 may provide credentials or permissions to customers 610 such that compute instance control operations/interactions between customers and in-use computing resources may be performed.

In various embodiments, control plane 650 may track the consumption of various computing instances consumed for different virtual computer resources, customers, user accounts, and/or specific instances. In at least some embodiments, control plane 650 may implement various administrative actions to stop, heal, manage, or otherwise respond to various different scenarios in the fleet of virtualization hosts 642 and instances 652, 654. Control plane 650 may also provide access to various metric data for customer(s) 610 as well as manage customer configured alarms.

In various embodiments, provider network 600 may also implement block-based storage service 620 for performing storage operations. In some embodiments, block based storage service may be implemented using a data-storage system that implements snapshot optimization as described in FIGS. 1-4. In some embodiments, the head nodes and data storage sleds of the data storage system may be included in data storage units as described in regard to FIG. 5.

Block-based storage service 620 is implemented using a data storage system, composed of one or more computing devices implementing a zonal control plane 630 and a pool of multiple data storage units 624a, 624b through 624n (e.g., data storage units such as data storage unit 500 illustrated in FIG. 5), which provide block level storage for storing one or more sets of data volume(s) 626a, 626b through 626n. Data volumes 626 may be attached, mounted, mapped, or otherwise connected to particular clients (e.g., a virtual compute instance of virtual compute service 640), providing virtual block-based storage (e.g., hard disk storage or other persistent storage) as a contiguous set of logical blocks. In some embodiments, a data volume 626 may be divided up into multiple data chunks or partitions (including one or more data blocks) for performing other block storage operations, such as snapshot operations or replication operations. A volume snapshot of a data volume 626 may be a fixed point-in-time representation of the state of the data volume 626. In some embodiments, volume snapshots may be stored remotely from a data storage unit 624 maintaining a data volume, such as in another storage service 660. Snapshot operations may be performed to send, copy, and/or otherwise preserve the snapshot of a given data volume in another storage location, such as a remote snapshot data store in other storage service 660. In some embodiments, a block-based storage service, such as block-based storage service 620, may store snapshots of data volumes stored in the block-based storage service.

In some embodiments, a data volume 626a, 626b, or 626n may be divided up into multiple data chunks (including one or more data blocks) for performing other block storage operations, such as snapshot operations or replication operations. A volume snapshot of a data volume 626a, 626b, or

626n may be a fixed point-in-time representation of the state of the data volume 626a, 626b, or 626n. In some embodiments, volume snapshots may be stored separately from a block-based storage service 620, such as in another storage service, such as object-based storage service 670. Snapshot operations may be performed to send, copy, and/or otherwise preserve the snapshot of a given data volume in another storage location, such as a remote snapshot data store in another storage service, such as object-based storage service 670.

In some embodiments, an object-based storage service, such as object-based storage service 670, may include a plurality of resource hosts that store snapshot objects and/or other storage object. For example, object-based storage service 670 includes resource hosts 672a and 672b through 672n storing snapshot objects 674a and 674b through 674n. Additionally, object-based storage service 670 includes resource hosts 676a and 676b through 676n storing storage objects 678a and 678b through 678n. For ease of illustration, snapshot objects 674 and storage objects 678 are illustrated as being stored on different resource hosts of object-based storage service 670. However, in some embodiments a same resource host of an object-based storage service, such as a resource host 672 of object-based storage service 670 may store both storage objects and snapshot objects, for example from a snapshot taken of a volume stored in block-based storage service 620 or from a machine image used by a target volume of a block-based storage service to boot a compute instance, such as one of compute instances 652 or 654.

Block-based storage service 620 may implement zonal control plane 630 to assist in the operation of block-based storage service 620. In various embodiments, zonal control plane 630 assists in creating volumes on data storage units 624a, 624b, through 624n and moving volumes between data storage units 624a, 624b, through 624n. In some embodiments, access to data volumes 626 may be provided over an internal network within provider network 600 or externally via network 680, in response to block data transaction instructions.

Zonal control plane 630 may provide a variety of services related to providing block level storage functionality, including the management of user accounts (e.g., creation, deletion, billing, collection of payment, etc.). Zonal control plane 630 may implement capacity management, which may generate and manage a capacity model for storage service 620, and may direct the creation of new volumes on particular data storage units based on the capacity of storage service 620. Zonal control plane 630 may further provide services related to the creation and deletion of data volumes 626 in response to configuration requests.

Customers 610 may encompass any type of customer configured to submit requests to network provider 600. For example, a given customer 610 may include a suitable version of a web browser, or may include a plug-in module or other type of code module configured to execute as an extension to or within an execution environment provided by a web browser. Alternatively, a customer 610 may encompass an application such as a database application (or user interface thereof), a media application, an office application or any other application that may make use of compute instances, a data volume 626, or other network-based service in provider network 600 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 610 may be configured to generate network-based services requests according to a Representational State Transfer (REST)-style network-based services architecture, a document- or message-based network-based services architecture, or another suitable network-based services architecture. In some embodiments, a customer 610 (e.g., a computational client) may be configured to provide access to a compute instance or data volume 626 in a manner that is transparent to applications implemented on the customer 610 utilizing computational resources provided by the compute instance or block storage provided by the data volume 626.

Customers 610 may convey network-based services requests to provider network 600 via external network 680. In various embodiments, external network 680 may encompass any suitable combination of networking hardware and protocols necessary to establish network-based communications between customers 610 and provider network 600. For example, a network 680 may generally encompass the various telecommunications networks and service providers that collectively implement the Internet. A network 680 may also include private networks such as local area networks (LANs) or wide area networks (WANs) as well as public or private wireless networks. For example, both a given customer 610 and provider network 600 may be respectively provisioned within enterprises having their own internal networks. In such an embodiment, a network 680 may include the hardware (e.g., modems, routers, switches, load balancers, proxy servers, etc.) and software (e.g., protocol stacks, accounting software, firewall/security software, etc.) necessary to establish a networking link between given customer 610 and the Internet as well as between the Internet and provider network 600. It is noted that in some embodiments, customers 610 may communicate with provider network 600 using a private network rather than the public Internet.

In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like.

Figure 7:
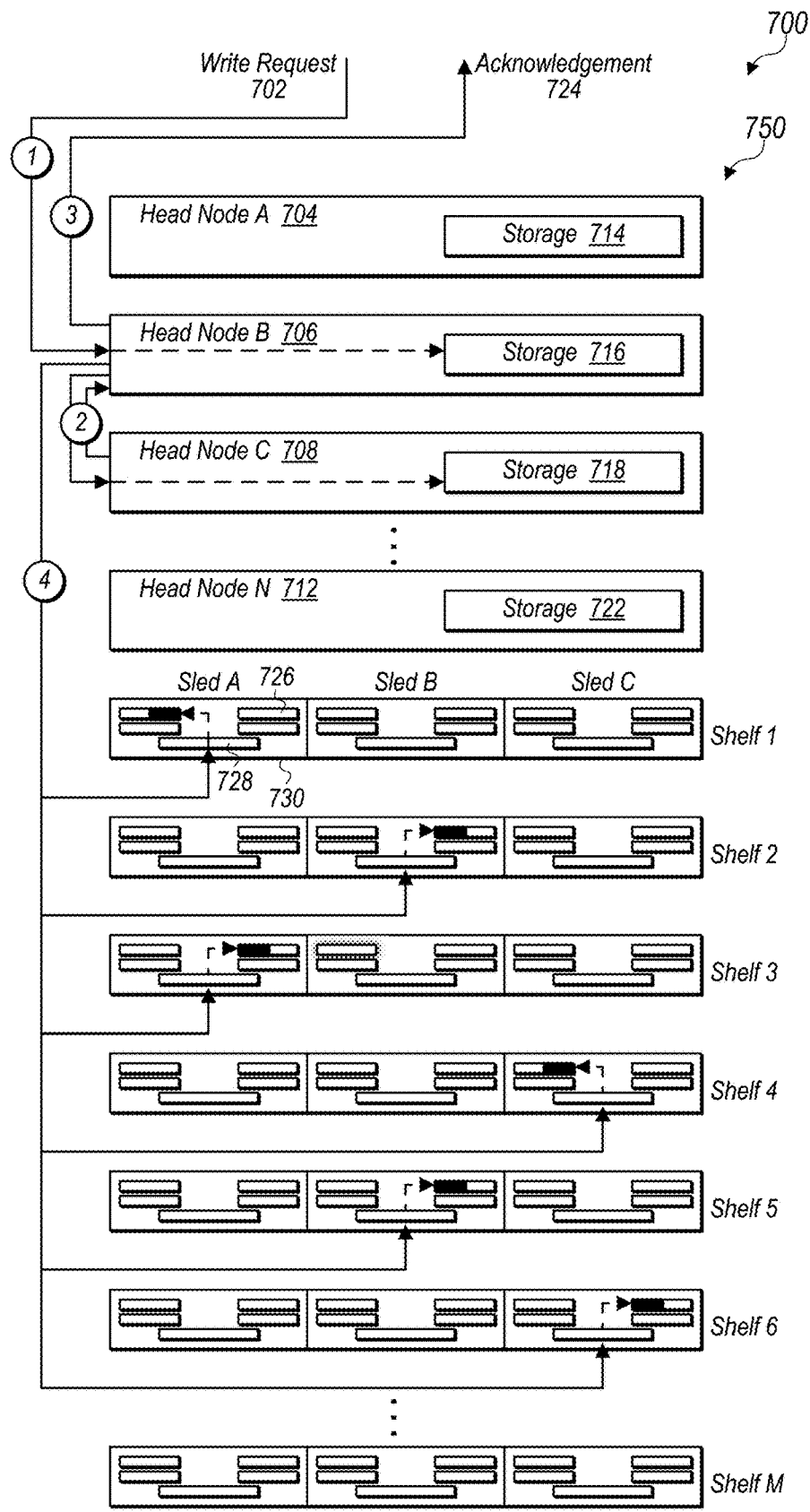
FIG. 7 is a block diagram illustrating head nodes and data storage sleds of a data storage unit of a data storage system storing block storage data in response to a write request, according to some embodiments.

FIG. 7 is a block diagram illustrating head nodes and data storage sleds of a data storage system storing block storage data in response to a write request, according to some embodiments. Head nodes 704, 706, and 708 illustrated in FIG. 7 may be the same as head node 104 illustrated in FIG. 1 and/or head nodes 506 illustrated in FIG. 5. Also, data storage sleds 730 may be the same as data storage sleds 112 illustrated in FIG. 1 and/or data storage sleds, 534-544 illustrated in FIG. 5.

As discussed above, a data storage system that includes a data storage unit, may store volume data in a data storage of a first head node designated as a primary head node for a volume or volume partition and may also replicate the volume data to one or more additional head nodes designated as reserve head nodes for the volume or volume partition. For example, at time 1, a write request 702 is routed to head node 706 that is designated as a primary head node for a volume or volume partition. At time 2 subsequent to the write request being received at head node 706, data included with the write request is stored in storage 716 of primary head node 706 and primary head node 706 causes the data included with the write request to be replicated to storage 718 of reserve head node 708. Replication of the data to reserve head node 708 is performed concurrently or nearly concurrently with storing the data in storage 716 of primary head node 706. Also, as shown in FIG. 7 at time 2, replication of the data to the reserve head node may include the reserve head node sending an acknowledgment back to the primary head node indicating that the data has been replicated to the reserve head node. Subsequently at time 3, which is also nearly concurrent with the data being stored in the storage of the primary head node and the data being replicated to the reserve head node, the primary head node, head node 706, may issue an acknowledgement 724 to the client device that requested write 702 indicating that the write has been committed in data storage system 700.

In some embodiments, a write request, such as write request 702, may be concurrently received at a primary head node and a reserve head node. In such embodiments, the primary head node may verify that the reserve head node has committed the write before acknowledging at time 3 that the write has been committed in the data storage system.

At a later point in time 4, e.g. asynchronous to times 1-3, the primary head node, e.g. head node 706, may cause data stored in storage 716, that includes the data included with the write request and that may include additional data stored before or after the write request, to be flushed to mass storage devices 726 of the data storage sleds 730 of the data storage unit. For example, at time 4 data is flushed to mass storage devices 726 of data storage sleds 730. In some embodiments, data is divided into portions and stored across multiple mass storage devices, each in a different sled and/or on a different shelf of a data storage unit. In some embodiments, data is also erasure encoded when stored in mass storage devices of data storage sleds. For example, data flushed from storage 716 of head node 706 may be divided into six portions where each portion is stored in a different mass storage device of a different data storage sled on a different shelf of a data storage unit 750 of data storage system 700 and is also erasure encoded across the different mass storage devices. For example data portions are stored in sled A of shelf 1, sled B of shelf 2, sled A of shelf 3, sled C of shelf 4, sled B of shelf 5, and sled C of shelf 6.

As discussed above, the quantity of data portions (e.g. stripes and/or parity partitions) to be stored to the mass storage devices of the data storage sleds may depend on whether or not snapshot optimization is enabled and whether or not a complete copy of the data being flushed is also stored in a snapshot maintained by another data storage system.

Also, as can be seen in FIG. 7, a data storage unit, such as data storage unit 750, may include "M" number of shelves and "N" number of head nodes. The portions of data may be stored on portions of mass storage devices 726 in the respective data storage sleds 730. In order to distinguish between a portion of data and a portion of space on a mass storage device, a portion of space on a mass storage device may be referred to herein as a "column" of a mass storage device. Furthermore, a set of columns of mass storage devices that store different portions of data of a volume such as the columns shown in sled A of shelf 1, sled B of shelf 2, sled A of shelf 3, sled C of shelf 4, sled B of shelf 5, and sled C of shelf 6 may collectively make up what is referred to herein as an "extent." For example, in an erasure encoded RAID six array, an extent may include six columns that collectively make up the RAID array. Four of the columns may store striped data and two of the columns may store parity data. In some embodiments, other replication algorithms other than erasure encoding may be used such as quorum algorithms, etc.

In some embodiments, each column of an extent may be in a different fault domain of a data storage unit. For example, for the extent being stored in FIG. 7 each column is located in a different data storage sled that is mounted on a different shelf of the data storage unit 750. Thus a failure of a sled controller, such as one of sled controllers 728, may only affect a single column. Also if a power supply of a data storage sled fails it may only affect a single data storage sled or if a part of a power distribution system fails it may affect a single shelf. However, because each column of an extent may be located in a different shelf, a shelf level power event may only affect a single column of the extent.

In some embodiments, a head node of a data storage unit, such as one of head nodes 704, 706, 708, or 712, may implement a local control plane. The local control plane may further implement an extent allocation service that allocates extents to head nodes designated as a primary head node for a volume or volume partition. In some embodiments, an extent allocation service may allocate a set of extents to a particular volume referred to herein as a "sandbox." The primary head node for the particular volume may then select extents to store data on during a data flush from the primary head node to data storage sleds of the data storage unit by selecting an extent from the sandbox allocated for the particular volume.

In some embodiments, if insufficient space is available in the particular volume's sandbox or if a particular placement would cause a data durability of data to be saved to fall below a minimum required durability for the particular volume, a primary head node for the particular volume may select columns outside of the particular volume's sandbox to write data for the particular volume. For example, a sandbox may include multiple columns that make up multiple extents in different ones of the data storage sleds 730 on different ones of the shelves of a data storage unit 750. A primary head node may be able to flush data to columns within a particular volume's sandbox without having to request extent allocation from a local control plane that implements an extent allocation service. This may further add durability and reliability to a data storage unit because a primary head node for the particular volume may continue to flush data even if communication is lost with a local control plane within the data storage unit. However, if space is not available or a placement would cause durability for a particular volume or volume partition to fall below a minimum threshold, a primary head node may flush data to columns outside of the particular volume's sandbox. In some embodiments, a primary head for a particular volume may flush data to columns outside the primary head node's sandbox without requesting an allocation from a local control plane that implements an extent allocation service. For example, a primary head node may store addresses for each sled controller in a data storage unit and may flush data to any sled controller in the data storage unit that is associated with mass storage devices with available columns.

In some embodiments, a sled controller of a data storage sled, such as sled controller 728, may implement a fencing protocol that prevents a primary head node from writing to columns for which another primary head node has assumed control after the primary head node has been superseded by another head node assuming the role of primary head node for a particular volume or volume partition. It should be pointed out that a reserve head node or other back-up head nodes may not flush data to data storage sleds and flushing may be limited to only being performed by a primary head node.

Because for a particular volume, the volume's data may be stored in a storage of a primary head node and replicated to one or more reserve head nodes and may later be moved to being stored across an extent of mass storage devices in different data storage sleds of a data storage unit, metadata comprising an index with pointers to where the data is stored may be used for subsequent read requests and write requests to locate the data. Also in some embodiments, storages of a head node may be log-structured such that incoming write request are written to the head of the log of the head node's log-structured storage. An index entry may be added indicating where the written data is stored in the head node's log and subsequently the index may be updated when the written data is flushed from the log of the primary head node to an extent comprising columns of mass storage devices of the data storage system.

In some embodiments, replication to the reserve head nodes may be performed synchronously with a write, whereas flushing of stored data, such as write data, from a primary head node to an extent implemented on a set of mass storage devices of the data storage sleds may be performed asynchronously with a write or a set of writes. For example, replicated writes to head nodes 708 and 710 from primary head node 706 may be performed synchronously with servicing write request 702 and prior to sending acknowledgment 724. Also, for example, flushing of data to data storage sleds 730 (performed at time 4) may be performed asynchronously with servicing write request 702 and after sending acknowledgment 724.

In some embodiments, a replicated write, replicated from a primary head node to a reserve head node, may include a current sequence number for the head nodes of a group of head nodes designated as primary or reserve head nodes for a particular volume partition to which the write is directed. In some embodiments, a reserve head node may store a greatest sequence number yet seen for the particular volume partition and may decline to perform a replicated write if a sequence number appended to a replicated write is inferior to a sequence number stored by the reserve head node for the particular volume partition.

In some embodiments, a primary head node, such as primary head node 706, may wait to receive a commitment acknowledgment from one or more reserve head nodes, such as reserve head node 708, before providing a commitment acknowledgement back to a customer, such as acknowledgement 724. For example, primary head node 706 may refrain from sending acknowledgment 724 until head node 708 has indicated that the volume data being replicated to head node 708 at time 2 has been written to storage 718 head node 708.

Figure 8A:
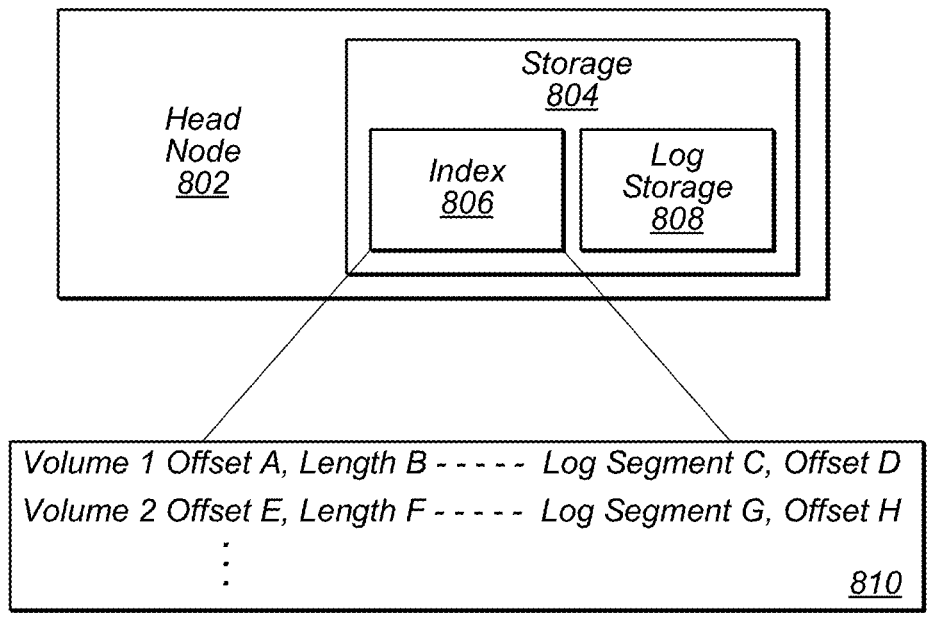
FIGS. 8A-8B are block diagrams illustrating a log storage and index of a head node storage, according to some embodiments.
Figure 8B:
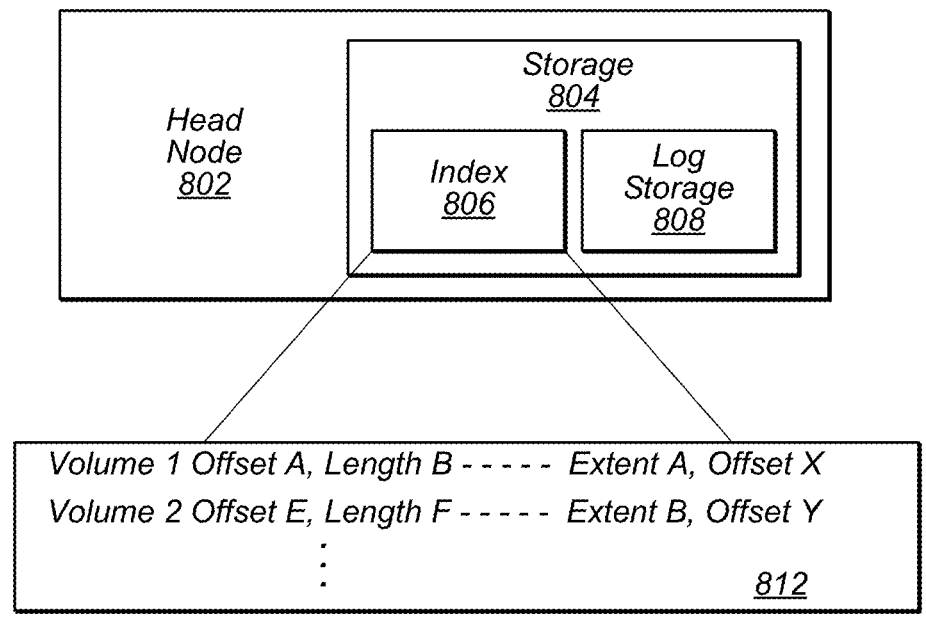

FIGS. 8A-8B are block diagrams illustrating a log-structured storage and an index of a head node storage, according to some embodiments. Head node 802 includes storage 804 that includes log 808 and index 806. Volume data may be stored in log 808 prior to being flushed to mass storage devices of a data storage unit. Index information 810 may include an entry for the volume data and a corresponding pointer to where the volume data is stored. For example, index information 810 indicates that data for volume 1, offset A, length B is stored in log storage 808 at log segment C and offset D. In some embodiments, a log of a head node such as log 808 of storage 804 of head node 802 may store data for more than one volume. For example, index information 810 also includes an entry for volume 2 offset E, length F and a corresponding pointer indicating the data for this volume entry is stored in log 808 at log segment G, offset H.

While FIGS. 8A-8B illustrate log storage 808 and index 806 as separate from each other, in some embodiments, an index, such as index 806, may lay on top of a log or side-by-side with a log, such as log storage 808.

When data for a volume is moved from a storage of a head node to being stored in an extent across multiple mass storage devices of a data storage unit, the data for the volume may be removed from a log of a head node storage and an index of the head node storage may be updated to indicate the new location at which the data for the volume is stored. For example, in FIG. 8B, index information 812 indicates that data for volume 1, offset A, length B is now stored at extent A, offset X and data for volume 2, offset E, length F is now stored at extent B, offset Y. Note that the labels "extent A" and "extent B" are used for ease of illustration. In some embodiments, an index may include addresses of data storage sleds where the data for the volume is located, such as local IP addresses of the data storage sleds, and addresses of the columns of the mass storage devices within the data storage sleds. In some embodiments, an index may include another label such as "extent A" where each head node stores information for locating "extent A" or may consult an extent allocation service for locating "extent A." In some embodiments, an index may include addresses of data storage sleds where the data for the volume is located and sled controllers of the data storage sleds may be able to determine the appropriate columns based on volume IDs stored in respective columns allocated to the volume.

When a read request is received by a head node designated as a primary head node for a volume, the head node may consult an index of a storage of the head node, such as index 806 of storage 804, to determine what is the latest version of the volume's data and where the latest version of the volume's data is stored. For example a primary head node, such as head node 802, may consult the primary head node's index, such as index 806, to determine if the latest version of the volume's data is stored in the head node's log, such as log 808, or is stored in an extent comprising mass storage devices of the data storage unit.

Figure 9:
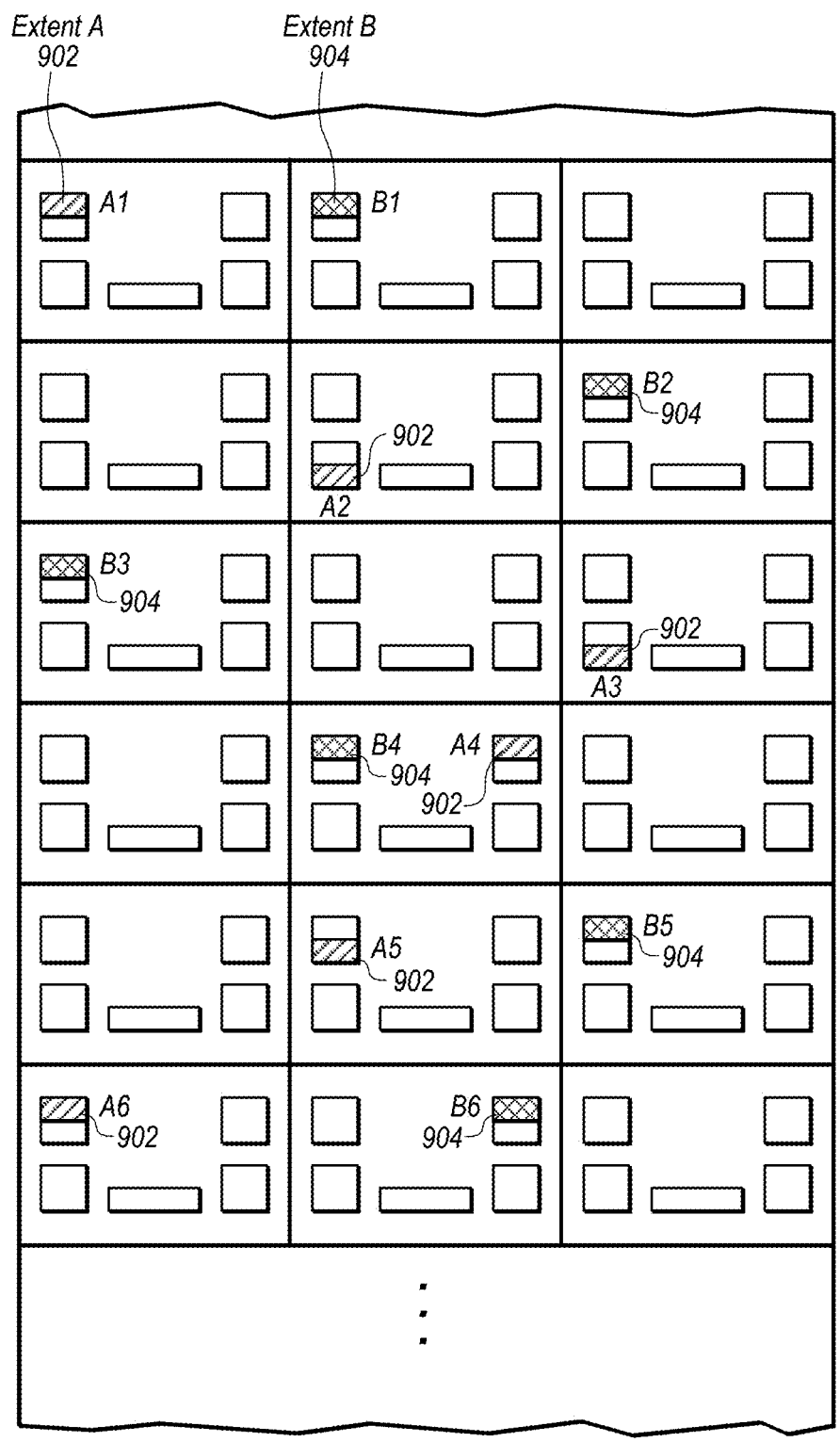
FIG. 9 illustrates a partial view of a data storage unit of a data storage system, wherein the data storage unit stores chunks of a volume partition in multiple mass storage devices in multiple data storage sleds on multiple shelves of the data storage unit, according to some embodiments.

FIG. 9 illustrates a partial view of a data storage unit that stores portions of a volume partition in multiple mass storage devices in multiple data storage sleds on multiple shelves of the data storage unit, according to some embodiments. FIG. 9 illustrates an example storage pattern for extent A from index 806 in FIG. 8B. Extent A from index 806 illustrated in FIG. 8B is shown as extent A 902 in FIG. 9 Also, an example storage pattern for extent B from index 806 illustrated in FIG. 8B is shown in FIG. 9 as extent B 904. Note that a data storage sled may include multiple columns of multiple extents. Also, in some embodiments a single mass storage device may include multiple columns of multiple extents.

Figure 10A:
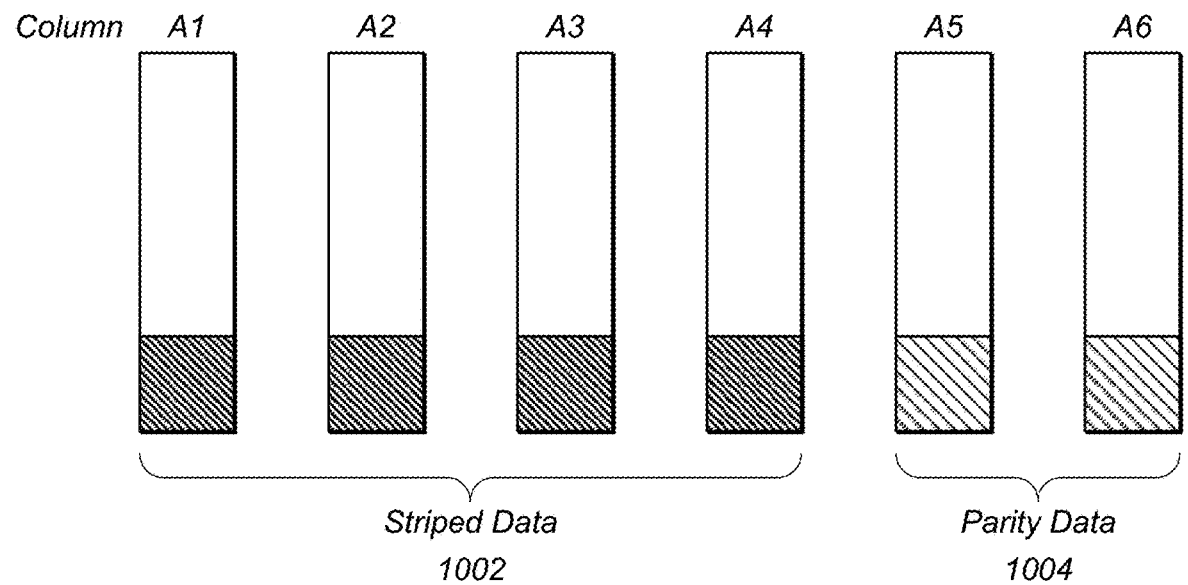
FIGS. 10A-10B illustrate columns of mass storage devices storing different portions of flushed volume data for a chunk of a volume partition, according to some embodiments.
Figure 10B:
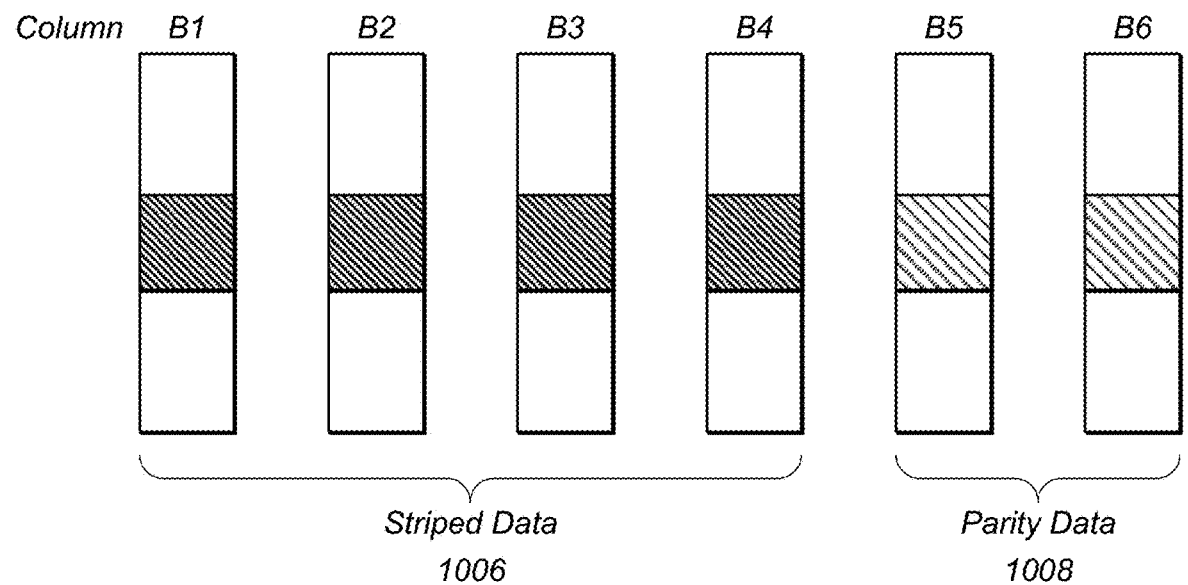

FIGS. 10A-B illustrate columns of mass storage devices storing different portions of a volume partition, according to some embodiments. FIG. 10A illustrates an embodiment in which data flushed to extent A, which may be the same extent A as described in FIGS. 8 and 9, is erasure encoded across 4+2 columns. The striped data 1002 may include the original data flushed from log 808 divided into multiple portions and the parity data 1004 may include encoded data that allows the flushed data to be recreated in case of failure of one or more of the mass storage devices or sleds that include one of the columns. FIG. 10B illustrates a similar embodiment where extent B is erasure encoded across four striped data columns 1006 and two parity columns 1008. Note that in FIG. 10B the data is stored in a different location in the column than is shown in FIG. 10A. This is intended to illustrate that the columns shown in FIG. 10B may already store data previously written to the columns of extent B, whereas the data being written to extent A may be the first set of data written to extent A. Also, it is worth noting that for a particular volume, multiple extents may be assigned to store data of the volume. In some embodiments, an extent may represent a fixed amount of storage space across a set number of columns of mass storage devices. When an extent is filled for a particular volume, another extent may be allocated to the volume by a head node or an extent allocation service. FIGS. 10A and 10B illustrate an example RAID level and erasure encoding technique. However, in some embodiments various other RAID levels may be used and various data coding techniques may be used to increase durability of stored data. It also worth noting that erasure encoding data may reduce a number of columns needed to achieve a particular level of durability. For example, data stored that is not erasure encoded may require the data to be stored redundantly across 8 columns to achieve a given level of durability, whereas a similar level of durability may be achieved by erasure encoding the data across fewer columns, such as 4+2 columns. Thus erasure encoding data may significantly reduce an amount of storage resources that are needed to store data to a particular level of durability. For example, data erasure encoded according to a 4+2 erasure coding scheme may be recreated from any four of the six columns, wherein the six columns include four columns of striped data segments and two columns of parity data segments.

FIGS. 11A-11D illustrate example erasure encoding schemes that may be used by a data storage system to store flushed volume data in data storage sleds of the data storage system, according to some embodiments.

Figure 11A:
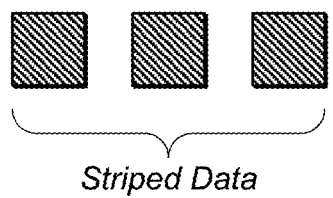
FIGS. 11A-11D illustrate example erasure encoding schemes that may be used by a data storage system to store flushed volume data in data storage sleds of the data storage system, according to some embodiments.
Figure 11A:
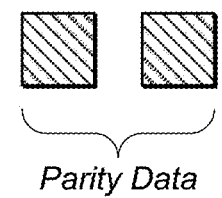
Figure 11B:
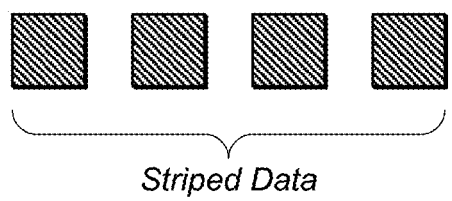
Figure 11B:
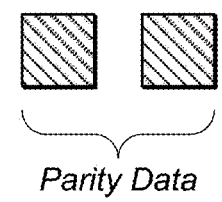
Figure 11C:
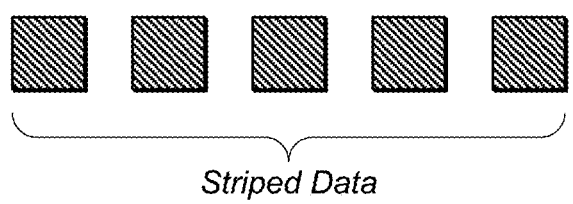
Figure 11C:
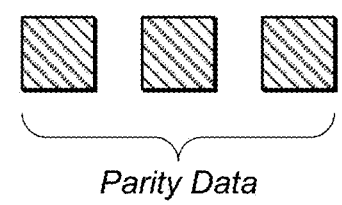
Figure 11D:
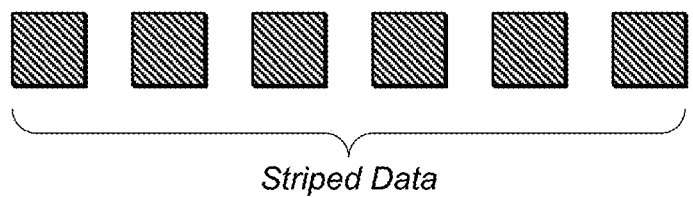
Figure 11D:
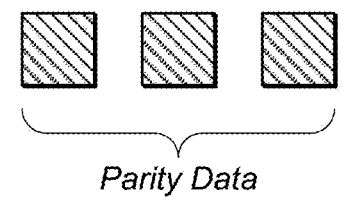

As discussed above, for example in regard to FIGS. 1-4, in some embodiments an erasure encoding scheme used to stored flushed volume data in the data storage sleds may be selected based on durability requirements of a service level agreement associated with a volume or volume partitions and/or whether or not snapshot optimization is enabled and a "dirty" or "clean" chunk is being flushed. For example, for some volumes with lower durability requirements a 3+2 erasure encoding scheme may be used, as illustrated in FIG. 11A. For other volumes with other durability requirements other erasure encoding schemes may be used such as a 4+2 erasure encoding scheme as illustrated in FIG. 11B, a 5+3 erasure encoding scheme as illustrated in FIG. 11C, or a 6+3 erasure encoding scheme as illustrated in FIG. 11D. Also for a same volume different erasure encoding schemes may be used depending upon whether or not a "dirty" or "clean" chunk is being flushed.

FIGS. 11E-11F illustrate example data duplication schemes that may be used by a data storage system to store flushed volume data in data storage sleds of the data storage system, according to some embodiments.

Also as discussed above, for example in regard to FIGS. 1-4, in some embodiments a data duplication scheme used to stored flushed volume data in the data storage sleds may be selected based on durability requirements of a service level agreement associated with a volume or volume partitions and/or whether or not snapshot optimization is enabled and a "dirty" or "clean" chunk is being flushed. For example, for some volumes three-way striped and three-way duplicated storage scheme may be used, as illustrated in FIG. 11E. For other volumes fewer duplicate stripes may be stored than original data stripes as shown in FIG. 11F. For example chunk data may be split into four stripes that are stored in the data storage sleds and also copied and split into three back-up stripes. Also for a same volume different erasure encoding or data duplication and striping schemes may be used depending upon whether or not a "dirty" or "clean" chunk is being flushed.

In some embodiments, if a complete copy of the chunk is also stored in an additional data storage system, no parity data or duplicate data may be stored. Also, in some embodiments, for data chunks for which a complete copy is stored in an additional data storage system, not volume data for that chunk may be stored to the data storage sleds as part of performing a flush. For example, the data storage system may rely on the complete copy of the volume data of the chunk stored in the additional data storage system.

FIG. 11G illustrates an example data storage scheme that may be used by a data storage system to store flushed volume data in data storage sleds of the data storage system, according to some embodiments.

As shown in FIG. 11G, in some embodiments, a "clean" chunk may be flushed to the data storage sleds without generating duplicate data or parity data for the "clean chunk."

FIG. 11G illustrates an example scheme that may be used by a data storage system to store flushed volume data in data storage sleds of the data storage system, wherein volume data that is durably stored in another data storage system is not stored in the data storage sleds, according to some embodiments.

As shown in FIG. 11G, in some embodiments, a flush operation may not cause any striped or parity data to be stored to the data storage sleds when flushing a "clean" chunk. In such embodiments, any subsequent calls on the "clean" chunk (e.g. reads or writes) may be serviced by either reading the data from a snapshot copy in the additional data storage system, or populating the head node with the data from the snapshot copy as part of committing a write in the data storage system. The written chunk when then be considered a "dirty" chunk and would be flushed to the data storage sleds as a "dirty" chunk in the next flush operation. In such a case, a different erasure encoding and/or data duplication scheme would be applied to the "dirty" chunk such that volume data for the dirty chunk would be written to the data storage sleds.

Figure 12:
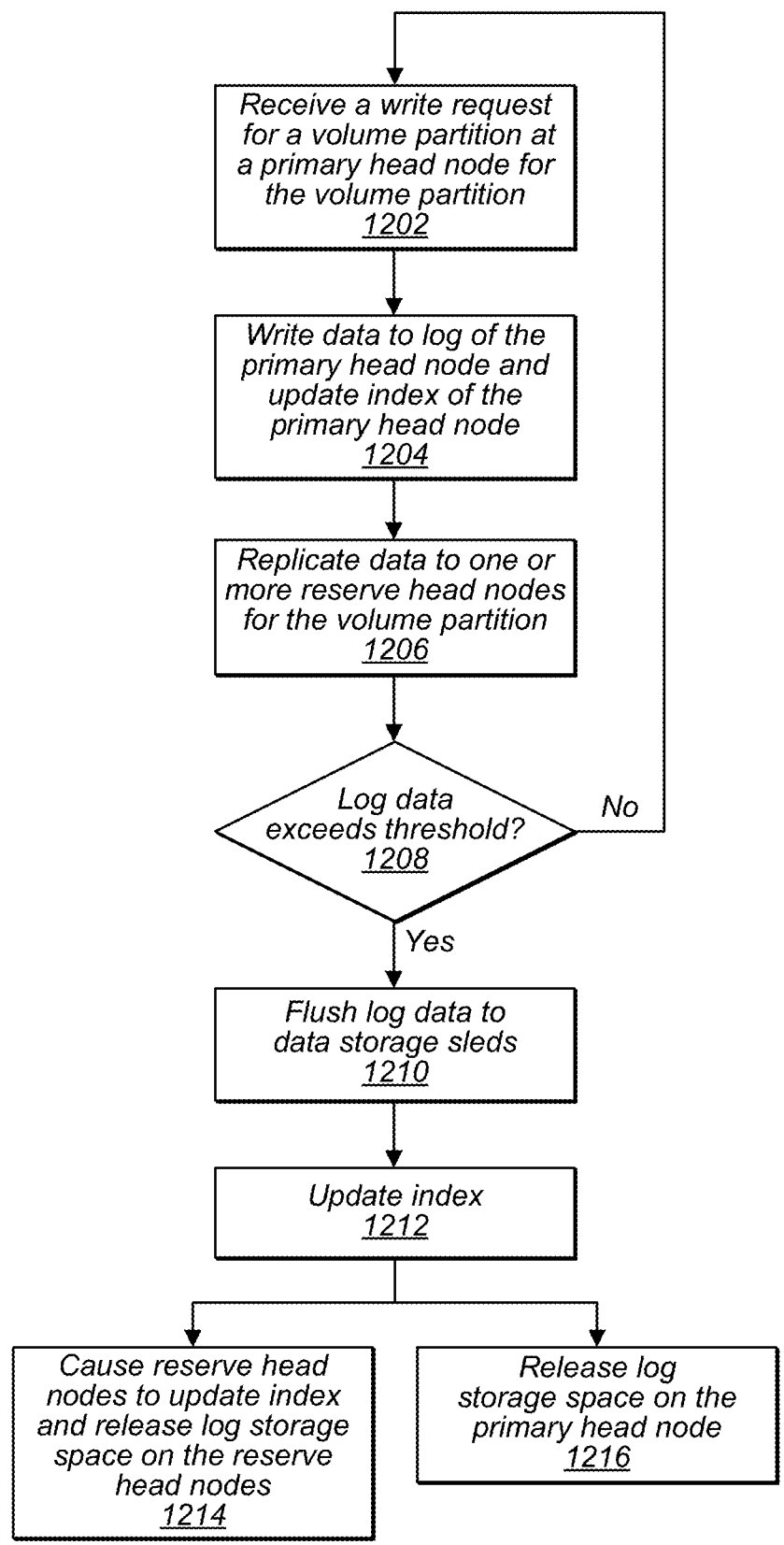
FIG. 12 is a high-level flowchart illustrating operations performed by a head node in response to a request to store data in a data storage unit of a data storage system, according to some embodiments.

FIG. 12 is a high-level flowchart illustrating operations performed by a head node in response to a request to store data in a data storage system, according to some embodiments.

At 1202, a data storage system receives a write request from a client device directed to a volume partition hosted by the data storage system and directs the write request to a head node of the data storage system that is functioning as a primary head node for the volume partition.

At 1204, upon receiving the write request from the client device, the head node writes data included with the write request to the log of the head node and updates the index of the head node to include an entry for the volume data and a pointer indicating where the volume data is stored.

At 1206, the primary head node causes the data included with the write request to be replicated to one or more reserve head nodes. The reserve head nodes then store the data in respective logs of the reserve head nodes and update respective indexes of the respective storages of the reserve head nodes. For example, each of the reserve head nodes may update an index of the storage of the reserve head node to include an entry for the replicated volume data and a pointer indicating where the replicated volume data is stored. The reserve head nodes may then send respective acknowledgements to the primary head node indicating that the volume data has been replicated in the storages of the reserve head nodes. In some embodiments, the primary head node then issues an acknowledgement to the client device indicating that the requested write has been persisted in the data storage system. In some embodiments, replication between head nodes could be primary and reserve e.g. master/slave replication. In some embodiments, other replication techniques such as a Paxos protocol, other consensus protocol, etc. may be used to replicate data between head nodes.

At 1208, the primary head node determines if the log data of the primary head node exceeds a threshold that would trigger the log data or a segment of the primary head node's log data to be flushed to extents that include columns of mass storage devices of data storage sleds of a data storage unit that includes the head node. In some embodiments, a threshold to trigger data to be flushed may include: an amount of data stored in the log or in a segment of the log, an amount of time that has elapsed since the data was last accessed or altered, a frequency at which the data is accessed or altered, or other suitable thresholds. In some embodiments, data flushed from a log of a head node may only include a portion of the data written to the log of the head node or a segment of the log of the head node. For example, older data stored in a log of a head node may be flushed while more recently written data may remain in the log of the head node. In some embodiments, a frequency of flush operations from a log of a head node may be throttled based on a variety of factors, such as a fill rate of the log of the head node or based on an amount of write requests being received by the head node or being received for a particular volume serviced by the head node.

In response to determining the threshold has not been met, the primary head node continues to write data to the log and reverts to 1202.

At 1210, in response to determining that the threshold has been met or exceeded, the primary head node causes data stored in the log of the primary head node or a segment of the log of the primary head node to be flushed to columns of mass storage devices in different ones of a plurality of data storage sleds of the data storage unit.

Moreover, as discussed herein, such as in regard to FIG. 1B, performing a flush operation may further involve determining whether or not snapshot optimization is enabled and for each chunk of volume data being flushed whether or not a complete copy of the chunk is also stored in a separate data storage system (e.g. whether or not the chunk being flushed is "dirty" or "clean").

At 1212, the primary head node updates the log of the primary head node to include a pointer for the volume data indicating that the flushed volume data is now stored in particular columns of mass storage devices or an extent that includes multiple columns of mass storage devices.

At 1214, the primary head node causes the reserve head nodes to update respective indexes of the reserve head nodes to indicate the new location of the volume data. The reserve head nodes also release the log space in the reserve head nodes that previously stored the replicated volume data.

At 1216, the head node acting as primary head node also releases space in the primary head node's log. In some embodiments, a garbage collection mechanism may cause log space to be released based on inspecting an index of a storage of a head node. In some embodiments, releasing log storage space may be performed concurrently with flushing log data or may be performed at some time subsequent to flushing log data.

Example Computer System

Figure 13:
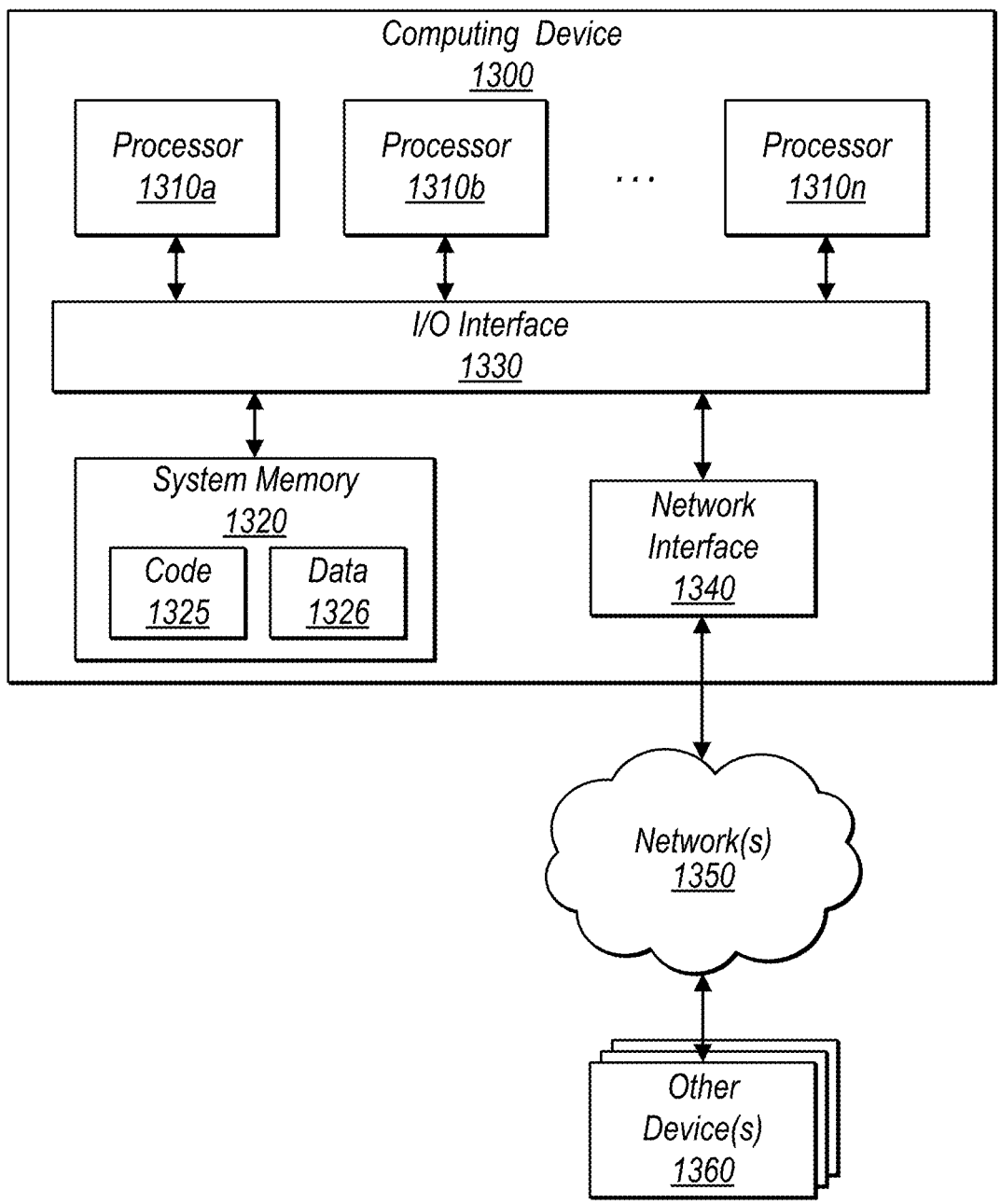
FIG. 13 is a block diagram illustrating an example computing system, according to some embodiments.

FIG. 13 is a block diagram illustrating an example computer system, according to various embodiments. For example, computer system 1300 may be configured to implement storage and/or head nodes of a data storage unit, storage and/or a sled controller of a data storage sled, other data stores, and/or a client, in different embodiments. Computer system 1300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1300 includes one or more processors 1310 (any of which may include multiple cores, which may be single or multi-threaded) coupled to a system memory 1320 via an input/output (I/O) interface 1330. Computer system 1300 further includes a network interface 1340 coupled to I/O interface 1330. In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. The computer system 1300 also includes one or more network communication devices (e.g., network interface 1340) for communicating with other systems and/or components over a communications network (e.g. Internet, LAN, etc.).

In the illustrated embodiment, computer system 1300 also includes one or more persistent storage devices 1360 and/or one or more I/O devices 1380. In various embodiments, persistent storage devices 1360 may correspond to disk drives, tape drives, solid state memory, other mass storage devices, block-based storage devices, or any other persistent storage device. Computer system 1300 (or a distributed application or operating system operating thereon) may store instructions and/or data in persistent storage devices 1360, as desired, and may retrieve the stored instruction and/or data as needed. For example, in some embodiments, computer system 1300 may host a storage unit head node, and persistent storage 1360 may include the SSDs that include extents allocated to that head node.

Computer system 1300 includes one or more system memories 1320 that are configured to store instructions and data accessible by processor(s) 1310. In various embodiments, system memories 1320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1320 may contain program instructions 1325 that are executable by processor(s) 1310 to implement the methods and techniques described herein. In various embodiments, program instructions 1325 may be encoded in platform native binary, any interpreted language such as Java™ byte-code, or in any other language such as C/C++, Java™, etc., or in any combination thereof. For example, in the illustrated embodiment, program instructions 1325 include program instructions executable to implement the functionality of a storage node, in different embodiments. In some embodiments, program instructions 1325 may implement multiple separate clients, nodes, and/or other components.

In some embodiments, program instructions 1325 may include instructions executable to implement an operating system (not shown), which may be any of various operating systems, such as UNIX, LINUX, Solaris™, MacOS™, Windows™, etc. Any or all of program instructions 1325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1340.

In some embodiments, system memory 1320 may include data store 1345, which may be configured as described herein. In general, system memory 1320 (e.g., data store 1345 within system memory 1320), persistent storage 1360, and/or remote storage 1370 may store data blocks, replicas of data blocks, metadata associated with data blocks and/or their state, configuration information, and/or any other information usable in implementing the methods and techniques described herein.

In one embodiment, I/O interface 1330 may be configured to coordinate I/O traffic between processor 1310, system memory 1320 and any peripheral devices in the system, including through network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems 1390, for example. In addition, network interface 1340 may be configured to allow communication between computer system 1300 and various I/O devices 1350 and/or remote storage 1370. Input/output devices 1350 may, in some embodiments, include one or more display terminals, keyboards, keypads, touchpads, scanning devices, voice or optical recognition devices, or any other devices suitable for entering or retrieving data by one or more computer systems 1300. Multiple input/output devices 1350 may be present in computer system 1300 or may be distributed on various nodes of a distributed system that includes computer system 1300. In some embodiments, similar input/output devices may be separate from computer system 1300 and may interact with one or more nodes of a distributed system that includes computer system 1300 through a wired or wireless connection, such as over network interface 1340. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet networks, for example. Additionally, network interface 1340 may support communication via telecommunications/telephony networks such as analog voice networks or digital fiber communications networks, via storage area networks such as Ethernet, Fibre Channel SANs, or via any other suitable type of network and/or protocol. In various embodiments, computer system 1300 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to customers as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A data storage system, comprising:
    a head node; and
    a plurality of mass storage devices,
    wherein the head node is configured to:
        determine, for a chunk of data stored in the data storage system, whether a complete copy of the chunk of data is also stored in another data storage system; and
        flush the chunk of data stored in the head node to the mass storage devices, wherein:
            if it is determined that a complete copy of the chunk of data is also stored in the other data storage system, to flush the chunk of data to the mass storage devices the head node is configured to:
                partition the data of the chunk into a plurality of partitions; and
                cause respective ones of the partitions to be stored on different ones of the mass storage devices of the data storage system; and
            if it is determined that a complete copy of the chunk of data is not also stored in the other data storage system, to flush the chunk of data to the mass storage devices the head node is configured to:
                erasure encode the data of the chunk to generate a plurality of data partitions and one or more parity partitions;
                cause respective ones of the data partitions to be stored on different ones of the mass storage devices of the data storage system; and
                cause respective ones of the one or more parity partitions to be stored on different ones of the mass storage devices of the data storage system.

2. The data storage system of claim 1, wherein to determine whether a complete copy of the chunk of data is also stored in the other data storage system, the head node is configured to maintain metadata for the chunk indicating:
    whether a snapshot copy of the chunk of data is stored in the other data storage system; and
    whether any modifying operations have been committed in the data storage system for the data chunk subsequent to the snapshot copy,
    wherein if a snapshot copy is stored in the other data storage system and no modifying operations have been committed in the data storage system subsequent to the snapshot copy, then the head node is configured to determine that a complete copy of the chunk of data is also stored in the other data storage system; and
    wherein if a snapshot copy is not stored in the other data storage system or if one or more modifying operations have been committed in the data storage system for the chunk subsequent to the snapshot copy, then the head node is configured to determine that a complete copy of the chunk of data is not also stored in the other data storage system.

3. The data storage system of claim 1, wherein the head node is configured to:
    maintain metadata for a volume comprising the chunk of data stored in the head node, wherein the metadata comprises, for each chunk of the volume, a first flag if a complete copy of the respective chunk of the volume is stored in the other data storage system, and wherein the metadata comprises a second flag if a complete copy of the respective chunk of the volume is not stored in the other data storage system.

4. The data storage system of claim 3, wherein the head node is further configured to:
    generate an updated snapshot copy for at least a portion of the volume subsequent to performing the flush; and
    update the respective flags included in the metadata for the chunks of the volume to indicate that a complete copy of the respective chunks are stored in the other data storage system.

5. The data storage system, of claim 1, wherein the chunk of data is part of a volume created in the data storage system from a snapshot copy stored in the other data storage system.

6. A head node for a data storage system, comprising:
    a processor,
    a data storage; and
    a memory storing program instructions, that when executed by the processor, cause the processor to:
        determine, for a chunk of data stored in the data storage of the head node, whether a copy of the chunk of data is also stored in another data storage system; and
    flush at least a portion of the chunk of data stored in the storage of the head node to mass storage devices of the data storage system, wherein:
        if it is determined that a copy of the chunk of data is not also stored in the other data storage system, to flush the chunk of data to the mass storage devices the head node is configured to:
            cause respective partitions for the chunk of data to be stored on different ones of the mass storage devices of the data storage system, wherein the respective partitions comprise: data partitions, parity partitions, or duplicated data partitions for the chunk of data; and
        if it is determined that a copy of the chunk of data is also stored in the other data storage system, to flush the chunk of data to the mass storage devices the head node is configured to:
            cause less partitions to be stored on the mass storage devices of the data storage system than are stored if it is determined that the copy of the chunk of data is not stored in the other data storage system.

7. The head node of claim 6, wherein the program instructions, when executed on the processor, cause the processor to:
maintain metadata for the chunk of data stored in the head node, wherein the metadata comprises a first indicator if a complete copy of the chunk of data is stored in the other data storage system, and wherein the metadata comprises a second indicator if a complete copy of the chunk of data is not stored in the other data storage system.

8. The head node of claim 7, wherein the metadata further comprises:
an additional first indicator for the chunk of data indicating a number of partitions to be stored in the mass storage devices if a complete copy of the chunk of data is stored in the other data storage system.

9. The head node of claim 7, wherein the additional first indicator indicates that no partitions are to be stored in the mass storage devices for the chunk of data if a complete copy of the chunk of data is stored in the other data storage system.

10. The head node of claim 7, wherein the additional first indicator indicates that striped data partitions are to be stored in the mass storage devices for the chunk of data if a complete copy of the chunk of data is stored in the other data storage system.

11. The head node of claim 7, wherein the additional first indicator indicates that striped data partitions and parity partitions or duplicate partitions are to be stored in the mass storage devices for the chunk of data if a complete copy of the chunk of data is stored in the other data storage system, wherein the number of parity partitions or duplicate partitions stored if the chunk of data is stored in the other data storage system is a smaller number of parity partitions or duplicate partitions than are stored for the chunk of data if it is determined that a complete copy of the chunk of data is not stored in the other data storage system.

12. The head node of claim 6, wherein the program instructions, when executed by the processors, cause the processor to:
determine a portion of the chunk of data stored on the mass storage devices has been lost; and
restore, in the data storage system, the portion of the chunk of data that has been lost.

13. The head node of claim 12, wherein to restore, in the data storage system, the portion of the chunk of data that has been lost, the program instructions, when executed by the processor, cause the processor to:
restore the portion of the chunk of data from one or more parity partitions stored in the mass storage devices of the data storage system, if available; or
if the one or more parity partitions are not available, restore the portion of the chunk of data from the copy of the chunk of data stored in the other data storage system.

14. The head node of claim 6, wherein the portion of data flushed to the mass storage devices is a block of a volume stored in the data storage system, wherein the chunk of data comprises a plurality of blocks, and wherein metadata indicating whether or not a copy of data stored in the data storage system is also stored in the other data storage system is maintained at a chunk-level.

15. One or more non-transitory, computer-readable media storing program instructions, that when executed on or across one or more processors, cause the one or more processors to:
determine, for a chunk of data stored in a data storage of a data storage system, whether a copy of the chunk of data is also stored in another data storage system; and
cause at least a portion of the chunk of data stored in the storage of the data storage system to be stored on a plurality of mass storage devices of the data storage system, wherein:
if it is determined that a copy of the chunk of data is not also stored in the other data storage system, the program instructions cause the one or more processors to:
cause respective partitions to be stored for the chunk of data on other different ones of the mass storage devices of the data storage system, wherein the respective partitions comprise: data partitions, parity partitions, or duplicated data partitions for the chunk of data; and
if it is determined that a copy of the chunk of data is also stored in the other data storage system, the program instructions cause the one or more processors to:
cause less partitions to be stored on the mass storage devices of the data storage system than are stored if it is determined that the copy of the chunk of data is not stored in the other data storage system.

16. The one or more non-transitory, computer readable media of claim 15, wherein the program instructions, when executed on or across the one or more processors, further cause the one or more processors to:
maintain metadata for the chunk of data indicating whether a complete copy of the chunk of data is stored in the other data storage system; and
determine a volume type for a volume of which the chunk of data is a part, wherein a number of partitions of the chunk of data to be stored on the mass storage devices is determined based, at least in part, on the volume type.

17. The one or more non-transitory, computer-readable media of claim 16, wherein if the volume type is a first volume type, the program instructions, when executed on or across the one or more processors, further cause the one or more processors to:
store data partitions of the chunk of data across mass storage devices if the copy of the chunk of data is stored in the other data storage system; and
store data partitions and parity partitions for the chunk of data across mass storage devices if the copy of the chunk of data is not stored in the other data storage system.

18. The one or more non-transitory, computer-readable media of claim 16, wherein if the volume type is a second volume type, the program instructions, when executed on or across the one or more processors, further cause the one or more processors to:
refrain from storing data of the data chunk on the mass storage devices if the copy of the chunk of data is stored in the other data storage system; and
store data partitions and parity partitions for the chunk of data across mass storage devices if the copy of the chunk of data is not stored in the other data storage system.

19. The one or more non-transitory, computer-readable media of claim 16, wherein if the volume type is a third volume type, the program instructions, when executed on or across the one or more processors, further cause the one or more processors to:

store data partitions and a first quantity of duplicate or parity partitions for the chunk of data across mass storage devices if the copy of the chunk of data is stored in the other data storage system; and store the data partitions and a greater quantity of parity or duplicate partitions for the chunk of data across the mass storage devices if the copy of the chunk of data is not stored in the other data storage system.

20. The one or more non-transitory, computer-readable media of claim 16, wherein the program instructions, when executed on or across the one or more processors, further cause the one or more processors to:

implement a storage interface configured to:

receive an indication from a client of the data storage system indicating a number of parity partitions to be stored in the data storage system for a volume if a snapshot copy of the volume is also stored in the other data storage system.

\* \* \* \* \*